US011860814B1

(12) United States Patent
Konda

(10) Patent No.: US 11,860,814 B1
(45) Date of Patent: Jan. 2, 2024

(54) SCALABLE DISTRIBUTED COMPUTING SYSTEM WITH DETERMINISTIC COMMUNICATION

(71) Applicant: Venkat Konda, San Jose, CA (US)

(72) Inventor: Venkat Konda, San Jose, CA (US)

(73) Assignee: Konda Technologies Inc., San Jose, CA (US)

( * ) Notice: Subject to any disclaimer, the term of this patent is extended or adjusted under 35 U.S.C. 154(b) by 0 days.

(21) Appl. No.: 17/516,692

(22) Filed: Nov. 1, 2021

Related U.S. Application Data

(60) Provisional application No. 63/108,436, filed on Nov. 1, 2020.

(51) Int. Cl.
*G06F 15/76* (2006.01)
*G06F 13/40* (2006.01)

(52) U.S. Cl.
CPC .......... *G06F 15/76* (2013.01); *G06F 13/4022* (2013.01)

(58) Field of Classification Search
CPC .............................. G06F 15/76; G06F 13/4022
(Continued)

(56) References Cited

U.S. PATENT DOCUMENTS 4,412,303 A * 10/1983 Barnes .............. G06F 15/17393
712/20
5,153,843 A 10/1992 Batcher
(Continued)

FOREIGN PATENT DOCUMENTS

WO    WO2008109756         9/2008
WO    WO 2008/147928 A1    12/2008
(Continued)

OTHER PUBLICATIONS

Yeh, C.- H., E.A. Varvarigos, and B. Parhami, "Efficient VLSI layouts of hypercubic networks," Proc. Symp. Frontiers of Massively Parallel Computation, Feb. 1999.
(Continued)

*Primary Examiner* — Chun Kuan Lee

(57) ABSTRACT

A scalable multi-stage hypercube-based interconnection network with deterministic communication between two or more processing elements ("PEs") or processing cores ("PCs") arranged in a 2D-grid using vertical and horizontal buses (i.e., each bus is one or more wires) is disclosed. In one embodiment the buses are connected in pyramid network configuration. At each PE, the interconnection network comprises one or more switches ("interconnect") with each switch concurrently capable to send and receive packets from one PE to another PE through the bus connected between them. Each packet comprises data token, routing information such as source and destination addresses of PEs and other information.

Each PE, in addition to interconnect, comprises a processor and/or memory. In one embodiment the processor is a Central Processing Unit ("CPU") comprises functional units that perform such as additions, multiplications, or logical operations, for executing computer programs. In another embodiment the processor comprises a domain specific architecture ("DSA") based Deep Neural Network ("DNN") processor comprising one or more multiply accumulate ("MAC") units for matrix multiply operations. In one embodiment at each PE processor, memory and interconnect are directly connected to each other. The 2D-grid of PEs is of size a×b where a≥1, b≥1, a+b>2, and both a and b are integers is disclosed.

Methods for all the PEs of the 2D-grid of PEs concurrently broadcasting packets to all the other PEs in the 2D-grid in a
(Continued)

non-blocking, collision-free and without requiring to queue in a deterministic number of time steps, in a fixed predetermined path between each two PEs are disclosed. Methods for all the PEs of the 2D-grid of PEs concurrently arbitrary fan-out multicasting and unicasting packets to the other PEs in the 2D-grid in a non-blocking, collision-free and without requiring to queue in a deterministic number of time steps, in a fixed predetermined path between each two PEs are also disclosed.

20 Claims, 19 Drawing Sheets

(58) Field of Classification Search
USPC .......................................................... 712/20
See application file for complete search history.

(56) References Cited

U.S. PATENT DOCUMENTS

| | | | |
|---|---|---|---|
| 5,451,936 | A | 9/1995 | Yang et al. |
| 5,680,597 | A * | 10/1997 | Kumar ................. G06F 9/30043 |
| | | | 712/E9.055 |
| 5,991,866 | A * | 11/1999 | Heller ............... G06F 15/17381 |
| | | | 712/12 |
| 6,018,523 | A | 1/2000 | Even |
| 6,185,220 | B1 | 2/2001 | Muthukrishnan et al. |
| 6,940,308 | B2 | 9/2005 | Wong |
| 8,170,040 | B2 | 5/2012 | Konda |
| 8,270,400 | B2 | 9/2012 | Konda |
| 8,363,649 | B2 | 1/2013 | Konda |
| 2010/0135286 | A1 | 6/2010 | Konda |
| 2010/0172349 | A1 | 7/2010 | Konda |
| 2011/0037498 | A1 | 2/2011 | Konda |
| 2011/0044329 | A1 | 2/2011 | Konda |
| 2016/0224465 | A1* | 8/2016 | Morad .................. G06F 9/3887 |
| 2020/0019847 | A1* | 1/2020 | Krishnamurthy ...... G06N 3/063 |

FOREIGN PATENT DOCUMENTS

| | | |
|---|---|---|
| WO | WO2008147926 | 12/2008 |
| WO | WO2008147927 | 12/2008 |

OTHER PUBLICATIONS

P. Manuel, W. K. Qureshi, A. William, A. Muthumalai, "VLSI layout of Benes networks,", J. of Discrete Math. Sci. & Cryptography, vol. 10, No. 4, pp. 461-472, 2007.

Ronald I. Greenberg, "The Fat-Pyramid and Universal Parallel Computation Independent of wire delay" IEEE Trans. Computers, 43(12):1358-1364, Dec. 1994.

Hypertree: A Multiprocessor Interconnection Topology, by James R. Goodman and Carlo H Sequin, Computer Science Technical Report #427, Dept, of EECS, University of California.

Data Movement Techniques for the pyramid computer, Russ Miller and Quentin F. Stout, SIAM Journal on Computing, vol. 16, No. 1, pp. 38-60, Feb. 1987.

Avior, A et al., A Tight Layout of the Butterfly Network. Proc. 8-th Annual ACM Symp. on Parallel Alg. and Arch. (SPAA '96), ACM Press Ed., 1996, pp. 170-175.

Y. Yamada, et al., "Folded Fat H-Tree: an interconnection topology for Dynamically Reconfigurable Processor Array", Embed and Ubiq. Cmpting, Intl Conf. EUC 2004.

André DeHon. Compact, Multilayer Layout for Butterfly Fat-Tree. In Twelfth Annual ACM Symposium on Parallel Algs and Architectures (SPAA 2000), p. 206-215, Jul. 9-12, 2000.

F. Petrini et al., k-ary n-trees: High performance networks for massively parallel architectures, in: Proceedings of the 11th Intl Parallel Proc. Symp., IPPS'97, pp. 87-93.

P.Pande et al. "Evaluation of MP-SoC Interconnect Architectures: a Case Study", Proceedings of 4th IWSOC, Banff, Alberta, Canada, Jul. 19-21, 2004.

Yeh, C.- H., Varvarigos, E.A., Parhami, B .: Multilayer VLSI layout for interconnection networks. In: Proc. Intl. Conf. on Parallel Processing, 2000.

Lukas Cavigelli and Luca Benini. 2016. Origami: A 803-GOp/s/W Convolutional Network Accelerator. IEEE Transactions on Circuits and Systems for Video Technology (Jul. 2016), 2461-2475.

Francisco Muñoz-Martínez, José L. Abellán, Manuel E. Acacio, Tushar Krishna: A novel network fabric for efficient spatio-temporal reduction in flexible DNN accelerators. NOCS '21: Proceedings of the 15th IEEE/ACM International Symposium on Networks-on-Chip, Oct. 2021 pp. 1-8.

Albert Reuther, Peter Michaleas, Michael Jones, Vijay Gadepally, Siddharth Samsi, and Jeremy Kepner: Survey and Benchmarking of Machine Learning Accelerators, IEEE High Performance Extreme Computing Conf., HPEC, Sep. 24-26, 2019.

Sheng-Chun Kao, Michael Pellauery, Angshuman Parashary, Tushar Krishna: DiGamma: Domain-aware Genetic Algorithm for HW-Mapping Co-optimization for DNN Accelerators, ICCAD '20, Nov. 2-5, 2020, Virtual Event, USA.1

Kiseok Kwon, Alon Amid, Amir Gholami, Bichen Wu, Krste Asanovic, Kurt Keutzer: Co-Design of Deep Neural Nets and Neural Net Accelerators for Embedded Vision Applications, DAC '18, Jun. 24-29, 2018, San Francisco, CA, USA.

Zidong Du, Robert Fasthuber, Tianshi Chen, Paolo lenne, Ling Li, Tao Luo, Xiaobing Feng, Yunji Chen, Olivier Temam: ShiDianNao: shifting vision processing closer to the sensor. International Symposium on Computer Architecture 2015: 92-104.

Kartik Hegde, Po-An Tsai, Sitao Huang, Vikas Chandra, Angshuman Parashar, Christopher W. Fletcher: Mind mappings: enabling efficient algorithm-accelerator mapping space search, ASPLOS '21: Proceedings of the 26th ACM International Conference on Architectural Support for Programming Languages and Operating SystemsApr. 2021 pp. 943-958.

Yu-Hsin Chen, Joel S. Emer, and Vivienne Sze. 2017. Using Dataflow to Optimize Energy Efficiency of Deep Neural Network Accelerators. IEEE Micro 37, 3 (Jun. 2017), 12-21.

Yu-Hsin Chen, Joel S. Emer, Tushar Krishna, and Vivienne Sze. 2017. Eyeriss: An Energy-Efficient Reconfigurable Accelerator for Deep Convolutional Neural Networks. IEEE Journal of Solid-State Circuits 52, 1 (Jan. 2017), 127-138.

Yu-Hsin Chen, Tien-Ju Yang, Joel Emer, and Vivienne Sze. 2019. Eyeriss v2: A Flexible Accelerator for Emerging Deep Neural Networks on Mobile Devices. IEEE Journal on Emerging and Selected Topics in Circuits and Systems 9, 2 (Jun. 2019), 292-308.

Y. Shen, M. Ferdman, and P. Milder, "Maximizing cnn accelerator efficiency through resource partitioning," in 2017 ACM/IEEE 44th Annual International Symposium on Computer Architecture (ISCA). IEEE, 2017, pp. 535-547.

Hyoukjun Kwon, Ananda Samajdar, and Tushar Krishna. 2018. MAERI: Enabling Flexible Dataflow Mapping over DNN Accelerators via Reconfigurable Interconnects. International Conf. on Architectural Support for Programming Languages and Operating Systems (ASPLOS) (Mar. 2018), 461-475.

Zhongyuan Zhao, Hyoukjun Kwon, Sachit Kuhar,Weiguang Sheng, Zhigang Mao, and Tushar Krishna. 2019. mRNA: Enabling Efficient Mapping Space Exploration for a Reconfigurable Neural Accelerator. International Symposium on Performance Analysis of Systems and Software (ISPASS) (Apr. 2019), 282-292.

Kun-Chih (Jimmy) Chen, Masoumeh Ebrahimi, et al.: 2019. NoC-Based DNN Accelerator: A Future Design Paradigm. In Proceedings of the 13th IEEE/ACM International Symposium on Networks-on-Chip. 1-8.

Hyoukjun Kwon, Prasanth Chatarasi, Michael Pellauer, Angshuman Parashar, Vivek Sarkar, and Tushar Krishna. 2019 Understanding Reuse, Performance, and Hardware Cost of DNN Dataflow: A Data-Centric Approach. International Symposium on Microarchitecture (MICRO) (Oct. 2019), 754-768.

Eric Qin, Ananda Samajdar, Hyoukjun Kwon, Vineet Nadella, Sudarshan Srinivasan, Dipankar Das, Bharat Kaul, and Tushar Krishna. 2020. SIGMA: A Sparse and Irregular GEMM Accelerator

(56) References Cited

OTHER PUBLICATIONS with Flexible Interconnects for DNN Training IEEE International Symposium on High-Performance Computer Architecture (HPCA) (Mar. 2020).

Yakun Sophia Shao, Jason Clemons, Rangharajan Venkatesan, Brian Zimmer, Matthew Fojtik, Nan Jiang, et al.,: Simba: Scaling Deep-Learning Inference with Multi-Chip-Module-Based Architecture, MICRO '52: Proceedings of the 52nd Annual IEEE/ACM International Symposium on Microarchitecture, Oct. 2019 pp. 14-27.

Ashish Gondimalla, Noah Chesnut, Mithuna Thottethodi, T. N. Vijaykumar: SparTen: A Sparse Tensor Accelerator for Convolutional Neural Networks, MICRO '52: Proceedings of the 52nd Annual IEEE/ACM International Symposium on Microarchitecture, Oct. 2019 pp. 151-165.

Vivienne Sze, Yu-Hsin Chen, Tien-Ju Yang, and Joel Emer. 2017. Efficient Processing of Deep Neural Networks: A Tutorial and Survey. arXiv preprint arXiv: 1703.09039v2 (2017) (Aug. 2017).

Hyoukjun Kwon, Ananda Samajdar, and Tushar Krishna. 2017. Rethinking NoCs for spatial neural network accelerators. In 2017 Eleventh IEEE/ACM International Symposium on Networks-on-Chip (NOCS). 1-8.

A. Parashar, P. Raina, Y. S. Shao, Y.- H. Chen, V. A. Ying, A. Mukkara, R. Venkatesan, B. Khailany, S. W. Keckler, and J. Emer, "Timeloop: A systematic approach to DNN accelerator evaluation," in 2019 IEEE international symposium on performance analysis of systems and software (ISPASS). IEEE, 2019, pp. 304-315.

Andrei Ivanov, Nikoli Dryden, Tal Ben-Nun, Shigang Li, and Torsten Hoefler. "Data Movement Is All You Need: A Case Study on Optimizing Transformers." Conference on Machine Learning and Systems, 2021.

L. N. Bhuyan and D. P. Agrawal. Generalized hypercube and hyperbus structures for a computer network. IEEE Trans. Computers, 33(4):323-333, 1984.

Avinash Karanth Kodi, Ashwini Sarathy, Ahmed Louri: IDEAL: Inter-router Dual-Function Energy and Area-Efficient Links for Network-on-Chip (NoC) Architectures. International Symposium on Computer Architecture, 2008: 241-250.

P Merolla, J Arthur, R Alvarez, JM Bussat, K Boahen; A Multicast Tree Router for Multichip Neuromorphic Systems, Circuits and Systems I: Regular Papers, IEEE Transactions 61 (3), 820-833.

J. Kim, W. J. Dally, and D. Abts. Flattened Butterfly : A Cost Efficient Topology for High-Radix Networks. In Proc. of the International Symposium on Computer Architecture (ISCA), pp. 126-137, San Diego, CA, Jun. 2007.

John Kim, James Balfour, and William Dally. Flattened butterfly topology for on-chip networks. In Proc. of the 40th International Symposium on Microarchitecture, pp. 172-182, Dec. 2007.

Kun Chih Chen, Masoumeh Ebrahimi, Ting Yi Wang and Yuch Chi Yang, "NoC-based DNN Accelerator: A Future Design Paradigm", Proceedings of IEEE/ACM International Symposium on Networks-on-Chip, pp. 1-8. 2019.

Pejman Lotfi-Kamran, Boris Grot, Babak Falsafi: NOC-Out: Microarchitecting a Scale-Out Processor. Proceedings of the 45th Annual International Symposium on Microarchitecture, Vancouver, Canada, Dec. 2012.

Alessandro Carrega; Suresh Singh; Roberto Bruschi, Raffaele Bolla; Traffic merging for energy-efficient datacenter networks, 2012, International Symposium on Performance Evaluation of Computer & Telecommunication Systems (SPECTS) Jul. 8-11, 2012.

* cited by examiner

SCALABLE DISTRIBUTED COMPUTING SYSTEM WITH DETERMINISTIC COMMUNICATION

CROSS REFERENCE TO RELATED APPLICATIONS

This application is Continuation In Part Application to and claims priority to the U.S. Provisional Patent Application Ser. No. 63/108,436 entitled "SCALABLE DETERMINISTIC COMMUNICATION SYSTEM FOR DISTRIBUTED COMPUTING" by Venkat Konda assigned to the same assignee as the current application, filed Nov. 1, 2020.

BACKGROUND OF INVENTION

This specification relates to distributed computing for massively parallel computational applications which requires scalable interconnection network. An example of such massively parallel computational application is distributed computing hardware for neural network training and inference.

Deep neural networks ("DNN") employ large number of hidden layers with an input layer and an output layer. The output of the input layer or each hidden layer is used as input to the next layer in the network, which is the next hidden layer or the output layer of the network. Each hidden layer of the network generates an output from a received input with current values of a respective set of reused weights.

Some of the well-known DNNs are: 1) Multi-Layer Perceptrons ("MLP"): Each hidden layer is a set of nonlinear functions of weighted sum of all outputs from preceding layer with the respective set of reused weights. MLP is fully connected network and so in distributed computing hardware requires concurrent broadcast of outputs; 2) Convolutional Neural Networks ("CNN"): Each hidden layer is a set of nonlinear functions of weighted sums of spatially nearby subsets of outputs from the preceding hidden layer with the respective set of reused weights. Since CNN is spatially nearby subsets of outputs in contrast to all outputs from the preceding hidden layer, distributed computing hardware requires concurrent multicast of certain fan-out of outputs from the preceding hidden layer; 3) Recurrent Neural Networks ("RNN"): Each succeeding layer is a collection of nonlinear functions of weighted sums of outputs from the preceding hidden layer and the previous state. An example of well-known RNN is Long Short-Term Memory (LSTM). The respective set of weights is reused across time steps.

Both the weighted sums of outputs from the preceding hidden layer and the set of weights can be represented as matrix structures typically in large dimensional space. Sparse neural networks ("SNN") are any of MLP, CNN, and LSTM where a significant percentage of values in the matrix structures are zeros.

Distributed computing hardware for massively parallel computational applications, in general, including DNN training and inference requires scalable interconnection network with capabilities of concurrent broadcast and scalable concurrent multicast of outputs or data tokens.

One way of building distributed computing hardware is with interconnection network that heuristically employs concurrent broadcast and multicast of data token requiring large buffers, resulting in out-of-order receipt of data tokens, frequent blocking in the interconnection network requiring complex software or compiler. The scalability of the distributed computing hardware is limited by the interconnection network architecture.

SUMMARY OF INVENTION

A scalable multi-stage hypercube-based interconnection network with deterministic communication between two or more processing elements ("PEs") or processing cores ("PCs") arranged in a 2D-grid using vertical and horizontal buses (i.e., each bus is one or more wires) is disclosed. In one embodiment the buses are connected in pyramid network configuration. At each PE, the interconnection network comprises one or more switches ("interconnect") with each switch concurrently capable to send and receive packets from one PE to another PE through the bus connected between them. Each packet comprises data token, routing information such as source and destination addresses of PEs and other information.

Each PE, in addition to interconnect, comprises a processor and/or memory. In one embodiment the processor is a Central Processing Unit ("CPU") comprises functional units that perform such as additions, multiplications, or logical operations, for executing computer programs. In another embodiment the processor comprises a domain specific architecture ("DSA") based Deep Neural Network ("DNN") processor comprising one or more multiply accumulate ("MAC") units for matrix multiply operations. In one embodiment at each PE processor, memory and interconnect are directly connected to each other. The 2D-grid of PEs is of size $a \times b$, where $a \geq 1$, $b \geq 1$, $a+b>2$, and both $a$ and $b$ are integers is disclosed.

Methods for all the PEs of the 2D-grid scalable for any number of PEs concurrently broadcasting packets to all the other PEs in the 2D-grid in a non-blocking, collision-free and without requiring to queue in a deterministic number of time steps are disclosed. Methods for all the PEs of the 2D-grid scalable for any number of PEs concurrently arbitrary fan-out multicasting and unicasting packets to the other PEs in the 2D-grid in a non-blocking, collision-free and without requiring to queue in a deterministic number of time steps are also disclosed.

DETAILED DESCRIPTION OF THE INVENTION

Figure 1A:
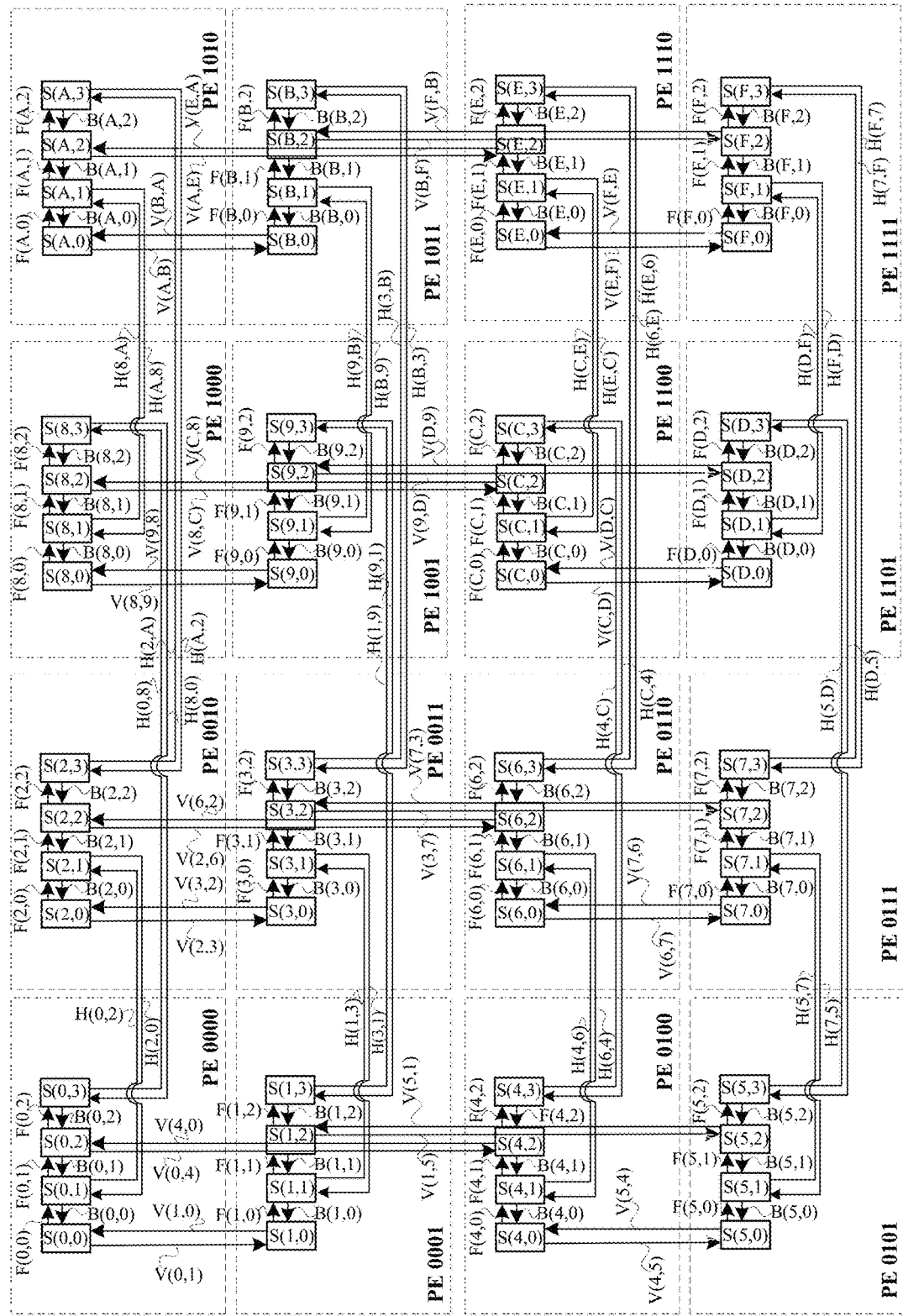
FIG. 1A is a diagram 100A of an exemplary multi-stage hypercube-based interconnection network with 4*4 2D-grid of Processing Elements ("PEs") connected in pyramid configuration for scalable distributed computing system with deterministic communication, in accordance with the invention.

The present invention discloses systems and methods for deterministic concurrent communication between PEs either 1) implemented in a two dimensional grid ("2D-grid") in a single die, or 2) implemented in a plurality of dies on a semiconductor wafer, or 3) implemented in a plurality of integrated circuits or chips; all the scenarios are called collectively called scalable distributed computing system or massively parallel system or multiprocessor system ("MPS"). In one embodiment the concurrent communication is each PE broadcasts data tokens to all the rest of PEs concurrently in a deterministic number of time steps. In another embodiment the concurrent communication is each PE multicasts data tokens to one or more of PEs concurrently in a deterministic number of time steps; if each PE concurrently transmits to another PE it is unicast and if each PE concurrently transmits to two or more other PEs it is multicast. The 2D-grid of PEs is of size $a \times b$, where $a \geq 1$, $b \geq 1$, $a+b > 2$, and both $a$ and $b$ are integers is disclosed.

A scalable multi-stage hypercube-based interconnection network to connect one or more PEs using vertical and horizontal buses is disclosed. Accordingly, each two PEs with connection between them, are connected by a separate bus in each direction where a bus is one or more wires. In one embodiment the buses are connected in pyramid network configuration, i.e., all the vertical buses and horizontal buses are connected between same corresponding switches of the PEs. At each PE, the interconnection network comprises one or more switches (collectively "interconnect") with each switch concurrently capable to send and receive packets from one PE to another PE through the bus connected between them. (To be specific, interconnection network is the combination of interconnects of all PEs i.e. including the switches and all buses connected to the switches of all PEs.) In one embodiment, each switch is implemented by one or more multiplexers. Each packet comprises data token, routing information such as source and destination addresses of PEs.

Each PE, in addition to interconnect, comprises a processor and memory. In one embodiment the processor is a Central Processing Unit ("CPU") comprises functional units that perform such as additions, multiplications, or logical operations, for executing computer programs. In another embodiment the processor comprises a domain specific architecture ("DSA") based Deep Neural Network ("DNN") processor comprising one or more multiply accumulate ("MAC") units for matrix multiply operations. In one embodiment each PE comprises processor, memory and interconnect which are directly connected to each two of them.

A balanced MPS architecture between processor, memory and interconnect is disclosed. That is the typical bottleneck in the interconnect is alleviated for the overall throughput of the MPS close to the peak throughout especially for embarrassingly parallel applications for example, today's popular DNNs such as Multi-Layer Perceptrons ("MLP"), Convolutional Neural Networks ("CNN"), Recurrent Neural Networks ("RNN") and Sparse Neural Networks ("SNN"). A scalable MPS to implement DNN processing requires concurrent broadcast and multicast between PEs in deterministic number of time steps. At each PE, matching the broadcast and multicast capability of interconnect, the capabilities for processor, memory and the bandwidth between each two of them will be provided for a balanced MPS architecture in accordance with the current invention. This is in contrast to providing maximum capabilities to processor, memory and the bandwidth between processor and memory but with a bottlenecked interconnect resulting in poor performance and throughput in the prior art solutions. The balanced MPS architecture disclosed in the current invention is power efficient with maximum performance at lower silicon area and also enables software simplicity.

Methods for all the PEs of the 2D-grid of PEs concurrently broadcasting packets to all the other PEs in the 2D-grid in a non-blocking, collision-free and without requiring to queue in a deterministic number of time steps, in a fixed predetermined path between each two PEs are disclosed. Methods for all the PEs of the 2D-grid of PEs concurrently arbitrary fan-out multicasting and unicasting packets to the other PEs in the 2D-grid in a non-blocking, collision-free and without requiring to queue in a deterministic number of time steps, in a fixed predetermined path between each two PEs are also disclosed.

Scalable multi-stage hypercube-based interconnection network with 4*4 2D-grid of PEs with buses connected in pyramid network configuration:

Referring to diagram 100A in FIG. 1A, in one embodiment, an exemplary multi-stage hypercube-based interconnection network between 16 PEs arranged in 4*4 grid where the number of rows is four and the number of columns is four. The 16 PEs are represented in binary format namely PE 0000, PE 0001, PE 0010, PE 0011, PE 0100, PE 0101, PE 0110, PE 0111, PE 1000, PE 1001, PE 1010, PE 1011, PE 1100, PE 1101, PE 1110, and PE 1111, since 4 bits are needed to represent 16 numbers and the corresponding decimal format being PE 0, PE 1, PE 2, PE 3, PE 4, PE 5, PE 6, PE 7, PE 8, PE 9, PE 10, PE 11, PE 12, PE 13, PE 14, and PE 15 respectively.

Each PE comprises four switches in pyramid network configuration. For example PE 0000 comprises four switches S(0,0), S(0,1), S(0,2), and S(0,3). F(0,0) is a forward bus connected from S(0,0) to S(0,1). F(0,1) is a forward bus connected from S(0,1) to S(0,2). F(0,2) is a forward bus connected from S(0,2) to S(0,3). B(0,0) is a backward bus connected from S(0,1) to S(0,0). B(0,1) is a backward bus connected from S(0,2) to S(0,1). B(0,2) is a backward bus connected from S(0,3) to S(0,2). All the right going buses are referred as forward buses and are denoted by F(x,y) where x={{0-9}∪{A-F}} and y={0-3}. All the left going buses are referred as backward buses and denoted by B(x,y) where x={{0-9}∪{A-F}} and y={0-3}.

Figure 1B:
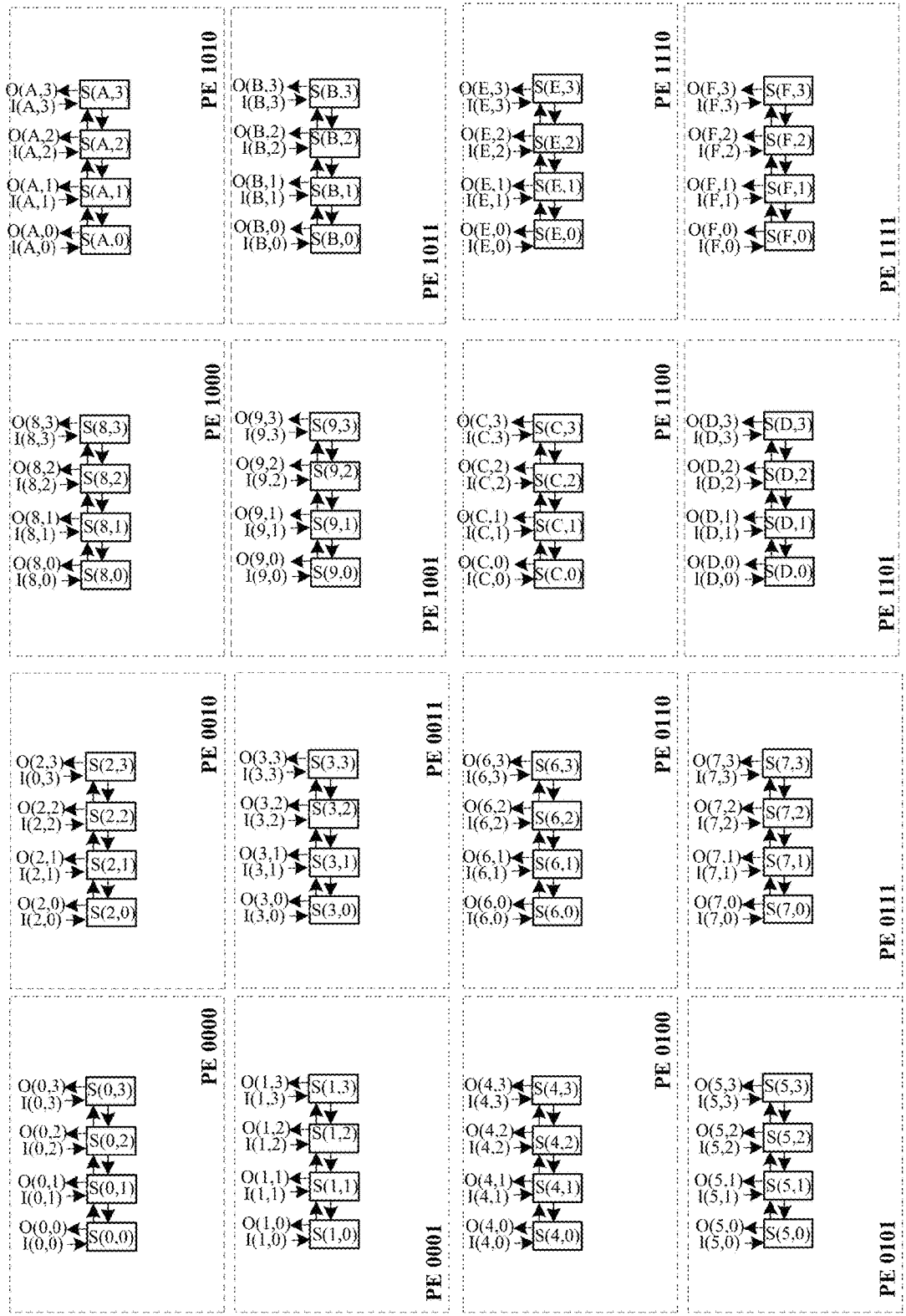
FIG. 1B is a diagram 100B with illustration of inlet buses and outlet buses in each PE of an exemplary multi-stage hypercube-based interconnection network with 4*4 2D-grid of PEs connected in pyramid configuration for scalable distributed computing system with deterministic communication, in accordance with the invention.
Figure 1C:
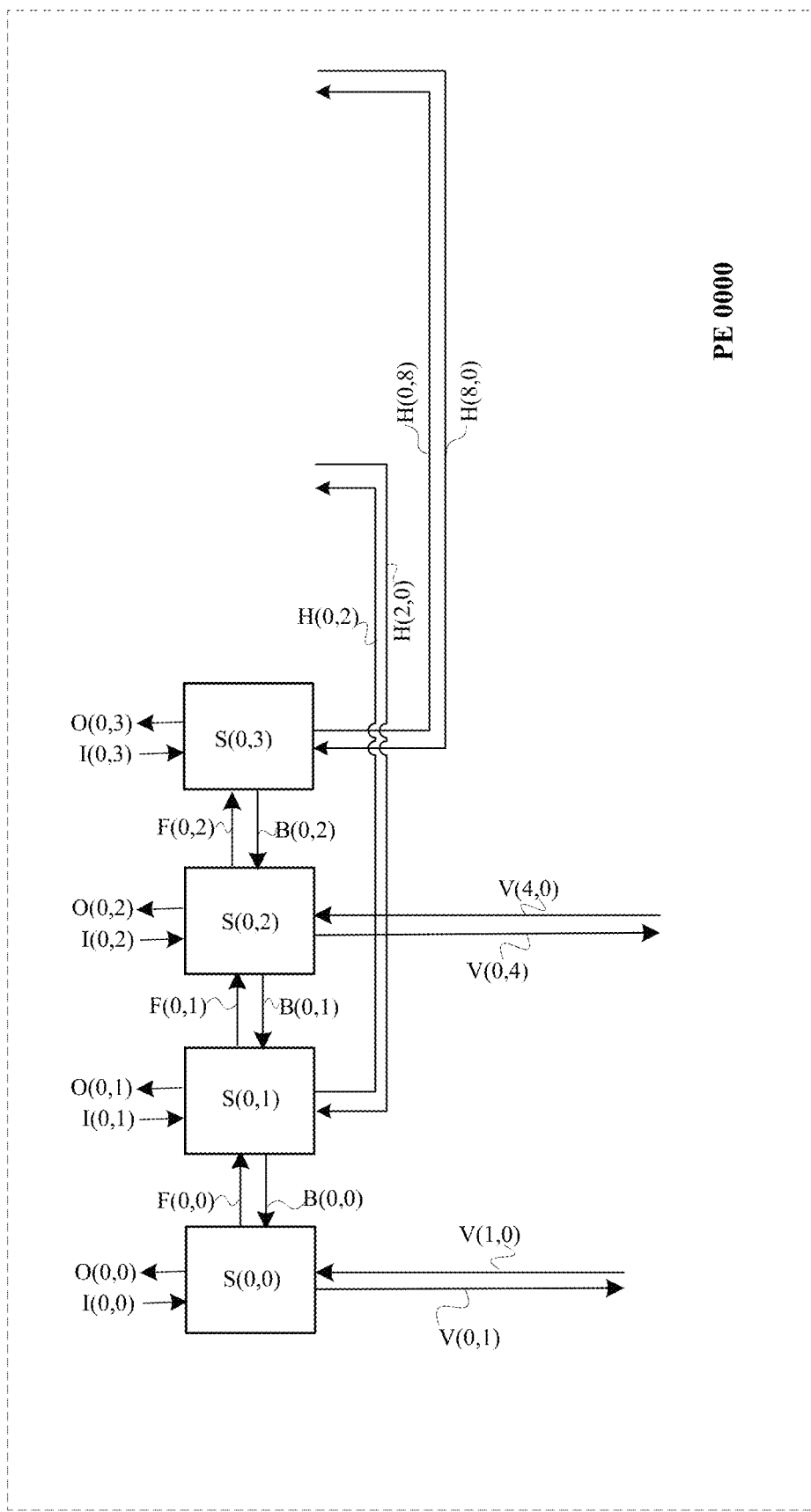
FIG. 1C is a diagram 100C of an exemplary PE 0000, with the details of interconnect, of multi-stage hypercube-based interconnection network arranged in 2D-grid of PEs for scalable distributed computing system with deterministic communication, in accordance with the invention.

Each of the four switches in each PE comprise one inlet bus and outlet bus as shown in diagram 100B of FIG. 1B. For example in PE 0000, switch S(0,0) comprises inlet bus I(0,0) and outlet bus O(0,0). Switch S(0,1) comprises inlet bus I(0,1) and outlet bus O(0,1). Switch S(0,2) comprises inlet bus I(0,2) and outlet bus O(0,2). Switch S(0,3) comprises inlet bus I(0,3) and outlet bus O(0,3). For simplicity of illustration the inlet buses and outlet buses to each switch of each PE are not shown in diagram 100A of FIG. 1A. Accordingly with the addition of inlet buses and outlet buses illustrated in diagram 100B of FIG. 1B to diagram 100A of FIG. 1A completes the multi-stage hypercube-based interconnection network between 16 PEs arranged in 4*4 grid. For example the diagram 100C in FIG. 1C illustrates the complete details the interconnect of PE 0000 i.e., combining the inlet buses and outlet buses shown in diagram 100B of FIG. 1B to diagram 100A of FIG. 1A of multi-stage hypercube-based interconnection network between 16 PEs arranged in 4*4 grid, in accordance with the current invention.

As illustrated in diagram 100A of FIG. 1A, the buses between PEs are either vertical buses or horizontal buses. A vertical bus is denoted by V(x,y) where x and y are decimal number representation of PEs and vertical bus is connected from PE x to PE y. Similarly a horizontal bus is denoted by H(x,y) where x and y are decimal number representation of PEs and horizontal bus is connected from PE x to PE y. In the multi-stage hypercube-based interconnection network diagram 100A of FIG. 1A, since all the 16 PEs are represented by 4 bits each, each PE is connected, by buses in both the directions, to four other PEs where the PE number differs in only one bit. The number of PEs each PE is connected to is called the degree of the multi-stage hypercube-based interconnection network disclosed in diagram 100A of FIG. 1A. Accordingly the degree of the multi-stage hypercube-based interconnection network disclosed in diagram 100A of FIG. 1A is four. For example PE 0000 number being 0000 the four PEs it is connected to are 1) PE 0001 where the least significant bit is different, 2) PE 0010 where the second least significant bit is different, 3) PE 0100 where the second most significant bit is different, and 4) PE 1000 where the most significant bit is different. Also switch S(0,0) in PE 0000 is connected to switch S(1,0) in PE 0001 by vertical bus V(0,1) and switch S(1,0) in PE 0001 is connected to switch S(0,0) in PE 0000 by vertical bus V(1,0). Switch (0,1) in PE 0000 is connected to switch S(2,1) in PE 0010 by horizontal bus H(0,2) and switch S(2,1) in PE 0010 is connected to switch S(0,1) in PE 0000 by horizontal bus H(2,0).

Switch S(0,2) in PE 0000 is connected to switch S(4,2) in PE 0100 by vertical bus V(0,4) and switch S(4,2) in PE 0100 is connected to switch S(0,2) in PE 0000 by vertical bus V(4,0). Switch (0,3) in PE 0000 is connected to switch S(8,3) in PE 0100 by horizontal bus H(0,8) and switch S(8,3) in PE 0100 is connected to switch S(0,3) in PE 0000 by horizontal bus H(8,0).

In one embodiment the buses are connected in pyramid network configuration, i.e., all the vertical buses and horizontal buses are connected between same corresponding switches of the PEs. For example, in diagram 100A of FIG. 1A, switch S(0,m) in PE 0000 is connected to switch S(1,m) in PE 0001 by vertical bus V(0,1) where m=0; And switch S(1,m) in PE 0001 is connected to switch S(0,m) in PE 0000 by vertical bus V(1,0) where m=0. That is vertical bus V(0,1) and vertical bus V(1,0) are connected between $0^{th}$ switches or same corresponding switches of PE 0000 and PE 0001 (specifically between switch S(0,0) of PE 0000 and switch S(1,0) of PE 0001). Similarly Switch (0,m) in PE 0000 is connected to switch S(2,m) in PE 0010 by horizontal bus H(0,2) where m=1; And switch S(2,m) in PE 0010 is connected to switch S(0,m) in PE 0000 by horizontal bus H(2,0) where m=1. That is horizontal bus H(0,2) and horizontal bus H(2,0) are connected between $1^{st}$ switches or same corresponding switches of PE 0000 and PE 0010 (specifically between switch S(0,1) of PE 0000 and switch S(2,1) of PE 0010). Similarly, in diagram 100A of FIG. 1A, all the vertical buses and horizontal buses are connected between same corresponding switches of the PEs and so all buses are referred to as connected in pyramid network configuration in diagram 100A of FIG. 1A.

In general, α×b processing elements are arranged in two dimensional grid so that a first processing element of α×b processing elements is placed $2^k$ hops away either vertically or horizontally from a second processing element of α×b processing elements if all n bits of representation in binary format of the first processing element and representation in binary format of the second processing element are the same in each bit excepting in one of either (2×k+1)th least significant bit or (2×k+2)th least significant bit differ where k≥0.

Also, in general, a switch of one or more switches of a first processing element of α×b processing elements is connected, by a $2^k$ hop length horizontal bus or a $2^k$ hop length vertical bus, to a switch of the one or more switches of a second processing element of α×b processing elements if all n bits of representation in binary format of the first processing element and representation in binary format of the second processing element are the same in each bit excepting in one of either (2×k+1)th least significant bit or (2×k+2)th least significant bit differ where k≥0 and also the switch of the one or more switches of the first processing element of α×b processing elements is connected, by a $2^k$ hop length horizontal bus or a $2^k$ hop length vertical bus, from the switch of the one or more switches of the second processing element of α×b processing elements if all n bits of representation in binary format of the first processing element and the representation in binary format of the second processing element are the same in each bit excepting in one of either (2×k+1)th least significant bit or (2×k+2)th least significant bit differ where k≥0 so that the interconnect of each processing element of α×b processing elements comprising one or more horizontal buses connecting to the interconnect of one or more processing elements of α×b processing elements and the interconnect of each processing element of α×b processing elements comprising one or more vertical buses connecting to the interconnect of one or more processing elements of α×b processing elements. Applicant notes that the PEs are connected by horizontal busses and vertical busses as in a binary hypercube network The diagram 100A of FIG. 1A with 4*4 2D-grid of PEs, a=4 and b=4. In the embodiment of diagram 100A of FIG. 1A, for example PE 0001 is placed $2^0$=1 hop away from PE 0000 since (2×0+1)th =$1^{st}$ least significant bit for PE 0000 is 0 which is different from $1^{st}$ least significant bit of PE 0001 which is 1. Accordingly, PE 0001 is placed one hop away vertically down from PE 0000. Similarly Also PE 0010 is placed $2^0$=1 hop away from PE 0000 since (2×0+2)th=$2^{nd}$ least significant bit for PE 0000 is 0 which is different from $2^{nd}$ least significant bit of PE 0010 which is 1. Accordingly, PE 0010 is placed one hop away horizontally to right from PE 0000. Similarly switch S(0,0) in PE 0000 is connected to switch S(1,0) in PE 0001 by vertical bus V(0,1) and switch S(1,0) in PE 0001 is connected to switch S(0,0) in PE 0000 by vertical bus V(1,0). And switch S(0,1) in PE 0000 is connected to switch S(2,1) in PE 0010 by horizontal bus H(0,2) and switch S(2,1) in PE 0010 is connected to switch S(0,1) in PE 0000 by horizontal bus H(2,0).

Alternatively, in accordance with the current invention, in another embodiment PE 0001 will be placed one hop away horizontally to right from PE 0000 and PE 0010 will be placed one hop away vertically down from PE 0000. Similarly a switch in PE 0000 will be connected to a switch in PE 0001 by a horizontal bus and a switch in PE 0001 will be connected to a switch in PE 0000 by a horizontal bus. And a switch in PE 0000 will be connected to a switch in PE 0010 by a vertical bus and switch in PE 0010 will be connected to a switch in PE 0000 by a vertical bus. More embodiments with modifications, adaptations and implementations described herein will be apparent to the skilled artisan.

There are four quadrants in the diagram 100A of FIG. 1A namely top-left, bottom-left, top-right and bottom-right quadrants. Top-left quadrant implements PE 0000, PE 0001, PE 0010, and PE 0011. Bottom-left quadrant implements PE 0100, PE 0101, PE 0110, and PE 0111. Top-right quadrant implements PE 1000, PE 1001, PE 1010, and PE 1011. Bottom-right quadrant implements PE 1100, PE 1101, PE 1110, and PE 1111. There are two halves in diagram 100A of FIG. 1A namely left-half and right-half. Left-half consists of top-left and bottom-left quadrants. Right-half consists of top-right and bottom-right quadrants.

Recursively in each quadrant there are four sub-quadrants. For example in top-left quadrant there are four sub-quadrants namely top-left sub-quadrant, bottom-left sub-quadrant, top-right sub-quadrant and bottom-right sub-quadrant. Top-left sub-quadrant of top-left quadrant implements PE 0000. Bottom-left sub-quadrant of top-left quadrant implements PE 0001. Top-right sub-quadrant of top-left quadrant implements PE 0010. Finally bottom-right sub-quadrant of top-left quadrant implements PE 0011. Similarly there are two sub-halves in each quadrant. For example in top-left quadrant there are two sub-halves namely left-sub-half and right-sub-half. Left-sub-half of top-left quadrant implements PE 0000 and PE 0001. Right-sub-half of top-left quadrant implements PE 0010 and PE 0011.

Recursively in larger multi-stage hypercube-based interconnection network where the number of PEs>16, the diagram in this embodiment in accordance with the current invention, will be such that the super-quadrants will also be connected as in a binary hypercube network.

Some of the key aspects of the multi-stage hypercube-based interconnection network are 1) the buses for each PE are connected as alternative vertical and horizontal buses. It scales recursively for larger multi-stage interconnection network of number PEs >16 as will be illustrated later; 2) the hop length of both vertical buses and horizontal buses are 2^0=1 and 2^1=2. And the longest bus is ceiling of half of the breadth (or width) of the complete 2D-grid. The hop length is measured as the number of hops between PEs; for example the hop length between nearest neighbor PEs is one. Breadth and width being 3 the longest bus is of size 2 or ceiling of 1.5. It also scales recursively for larger multi-stage interconnection network of number PEs>16 as will be illustrated later;

The diagram 100A in FIG. 1A, 100B in FIG. 1B, and 100C in FIG. 1C can be recursively extended for any larger size multi-stage hypercube-based interconnection network with the sub-quadrants, quadrants, and super-quadrants are arranged in binary hypercube manner and also the vertical and horizontal buses are accordingly connected in binary hypercube topology.

Figure 2:
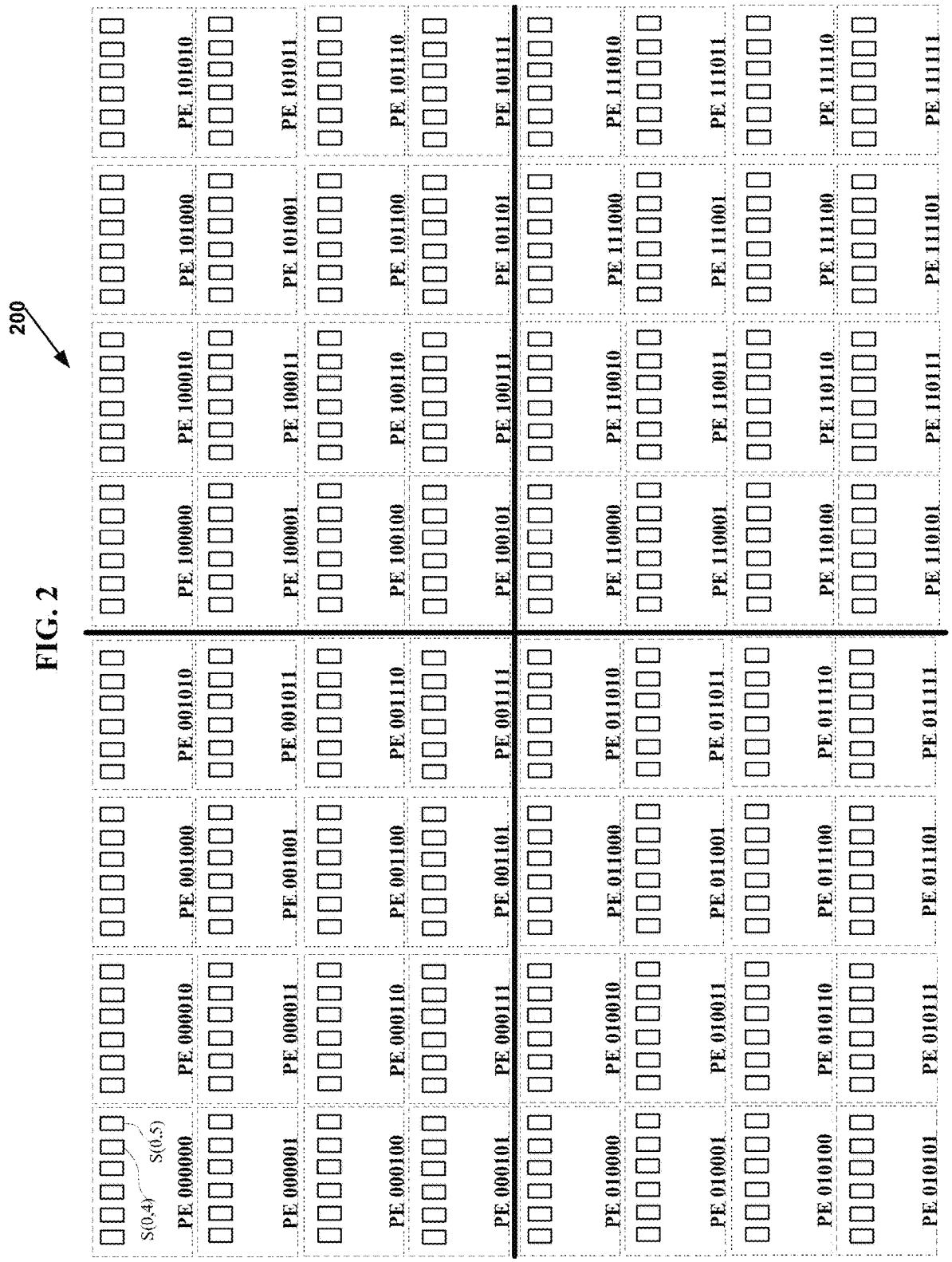
FIG. 2 is a diagram 200 of an exemplary multi-stage hypercube-based interconnection network with 8*8 2D-grid of 64 PEs for scalable distributed computing system with deterministic communication, illustrating the scalability of switches, in accordance with the invention.

Referring to diagram 200 of FIG. 2, illustrates the extension of multi-stage hypercube-based interconnection network 100A of FIG. 1A, 100B in FIG. 1B, and 100C in FIG. 1C for 2D-grid of size **8*8. There are four super-quadrants in diagram 200 namely top-left super-quadrant, bottom-left super-quadrant, top-right super-quadrant, bottom-right super-quadrant. Total number of PEs in diagram 200 is sixty four. Top-left super-quadrant implements PEs from PE 000000 to PE 001111. Each PE in all the super-quadrants has two more bits to represent the PE number in binary format representation and also has two more switches namely switch S(x,4) and switch s(x,5), with each switch having one inlet bus and one outlet bus just like it is illustrated in diagram 100B of FIG. 1B, in addition to the four switches illustrated in diagram 100A of FIG. 1A, 100B in FIG. 1B, and 100C in FIG. 1C. The bus connection topology is exactly the same between the switches S(x,y) where x={{0–9}∪{A–F}} and y={0–3} as it is shown in diagram 100A of FIG. 1A. The degree of the multi-stage hypercube-based interconnection network disclosed in diagram 200 of FIG. 2** is six.

Bottom-left super-quadrant implements the blocks from PE 010000 to PE 011111. Top-right super-quadrant implements the blocks from PE 100000 to PE 101111. And bottom-right super-quadrant implements the blocks from PE 110000 to PE 111111. In all these three super-quadrants also, the bus connection topology is exactly the same between the switches S(x,y) where x={{0–9}∪{A–F}} and y={0–3} as it is shown in diagram 100 of FIG. 1A and just as that of the top-left super-quadrant.

Recursively in accordance with the current invention, the buses connecting between the switches S(*,4) are vertical buses in top-left super-quadrant, bottom-left super-quadrant, top-right super-quadrant and bottom-right super-quadrant. The buses connecting between the switches S(*,5) are vertical buses in top-left super-quadrant, bottom-left super-quadrant, top-right super-quadrant and bottom-right super-quadrant. For simplicity of illustration, only S(0,4) and S(0,5) are numbered in PE 000000 and none of the buses between connected switches S(*,4) and the buses between connected switches S(*,5) are shown in diagram 200 of FIG. 2.

Figure 3:
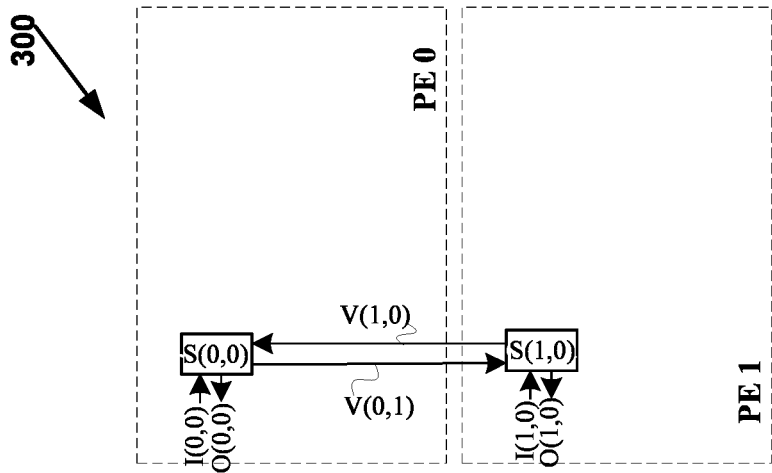
FIG. 3 is a diagram 300 of an exemplary multi-stage hypercube-based interconnection network with 2*1 2D-grid of PEs connected in pyramid configuration for scalable distributed computing system with deterministic communication, in accordance with the invention.

Now multi-stage hypercube-based interconnection network for 2D-grid where number of PEs is less than 16 are illustrated. Referring to diagram 300 of FIG. 3 is multi-stage hypercube-based interconnection network of 2*1 2D-grid with the number of PEs is 2. There are two PEs i.e., PE 0 and PE 1 with PE 0 comprising switch S(0,0) and PE 1 comprising switch S(1,0). Switch S(0,0) in PE 0 has one inlet bus I(0,0) and one outlet bus 0(0,0). Switch S(1,0) in PE 1 has one inlet bus I(1,0) and one outlet bus 0(1,0). Since only one bit is needed to represent number of PEs, there is only one switch in each PE. And there is only one vertical bus V(0,1) connected from Switch S(0,0) in PE 0 to Switch (1,0) in PE 1 and there is only one vertical bus V(1,0) connected from Switch S(1,0) in PE 1 to Switch (0,0) in PE 0. The degree of the multi-stage hypercube-based interconnection network disclosed in diagram 300 of FIG. 3 is one. Applicant notes that the buses between PE 0 and PE 1 are vertical buses in this embodiment. In another embodiment PE 0 and PE 1 is placed horizontally and the buses between PE 0 and PE 1 are horizontal buses.

Figure 4:
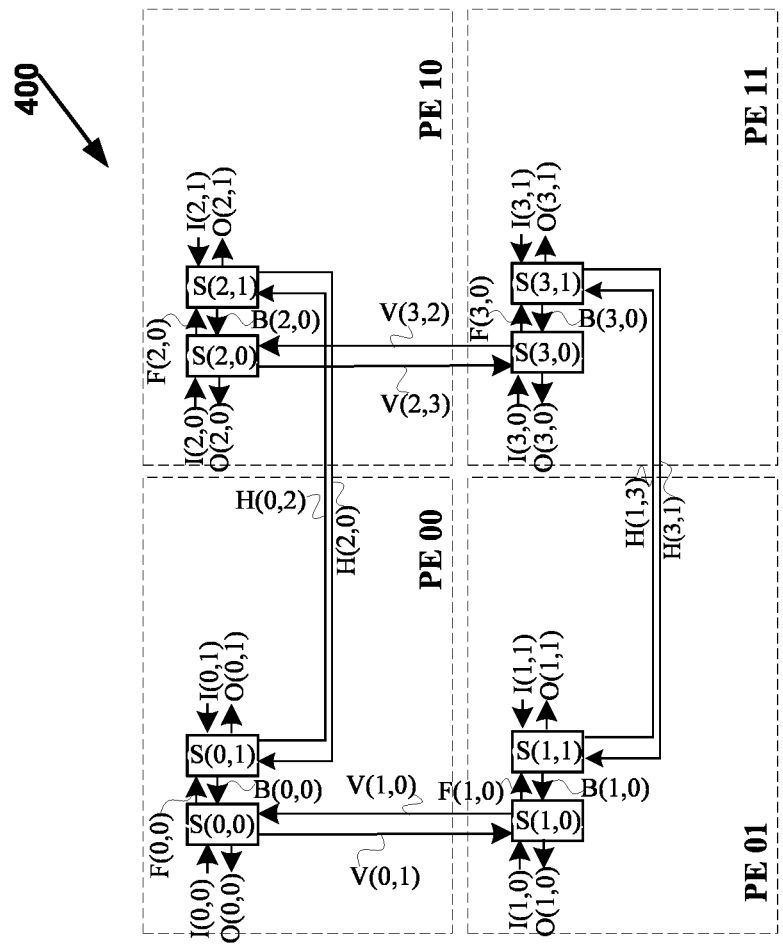
FIG. 4 is a diagram 400 of an exemplary multi-stage hypercube-based interconnection network with 2*2 2D-grid of PEs connected in pyramid configuration for scalable distributed computing system with deterministic communication, in accordance with the invention.

Referring to diagram 400 of FIG. 4 is multi-stage hypercube-based interconnection network of 2*2 2D-grid with the number of PEs is 4. There are four PEs namely PE 00, PE 01, PE 10, and PE 11. Each PE comprises two switches and each switch comprises one inlet bus and outlet bus. For example PE 0000 has two switches S(0,0) and S(0,1). Switch S(0,0) comprises inlet bus I(0,0) and outlet bus 0(0,0). Switch S(0,1) comprises inlet bus 40,1) and outlet bus 0(0,1). F(0,0) is a forward bus connected from S(0,0) to S(0,1). B(0,0) is a backward bus connected from S(0,1) to S(0,0).

In accordance with the current invention, in the multi-stage hypercube-based interconnection network diagram 400 of FIG. 4, since all the 4 PEs are represented by 2 bits each, each PE is connected, by buses in both the directions, to two other PEs where the PE number differs in only one bit. For example PE 00 number being 00 the two PEs it is connected to are 1) PE 01 where the least significant bit is different and 2) PE 10 where the most significant bit is different. Also switch S(0,0) in PE 00 is connected to switch S(1,0) in PE 01 by vertical bus V(0,1) and switch S(1,0) in PE 01 is connected to switch S(0,0) in PE 00 by vertical bus V(1,0). Switch (0,1) in PE 00 is connected to switch S(2,1) in PE 10 by horizontal bus H(0,2) and switch S(2,1) in PE 10 is connected to switch S(0,1) in PE00 by horizontal bus H(2,0). The degree of the multi-stage hypercube-based interconnection network disclosed in diagram 300 of FIG. 3 is two.

Figure 5A:
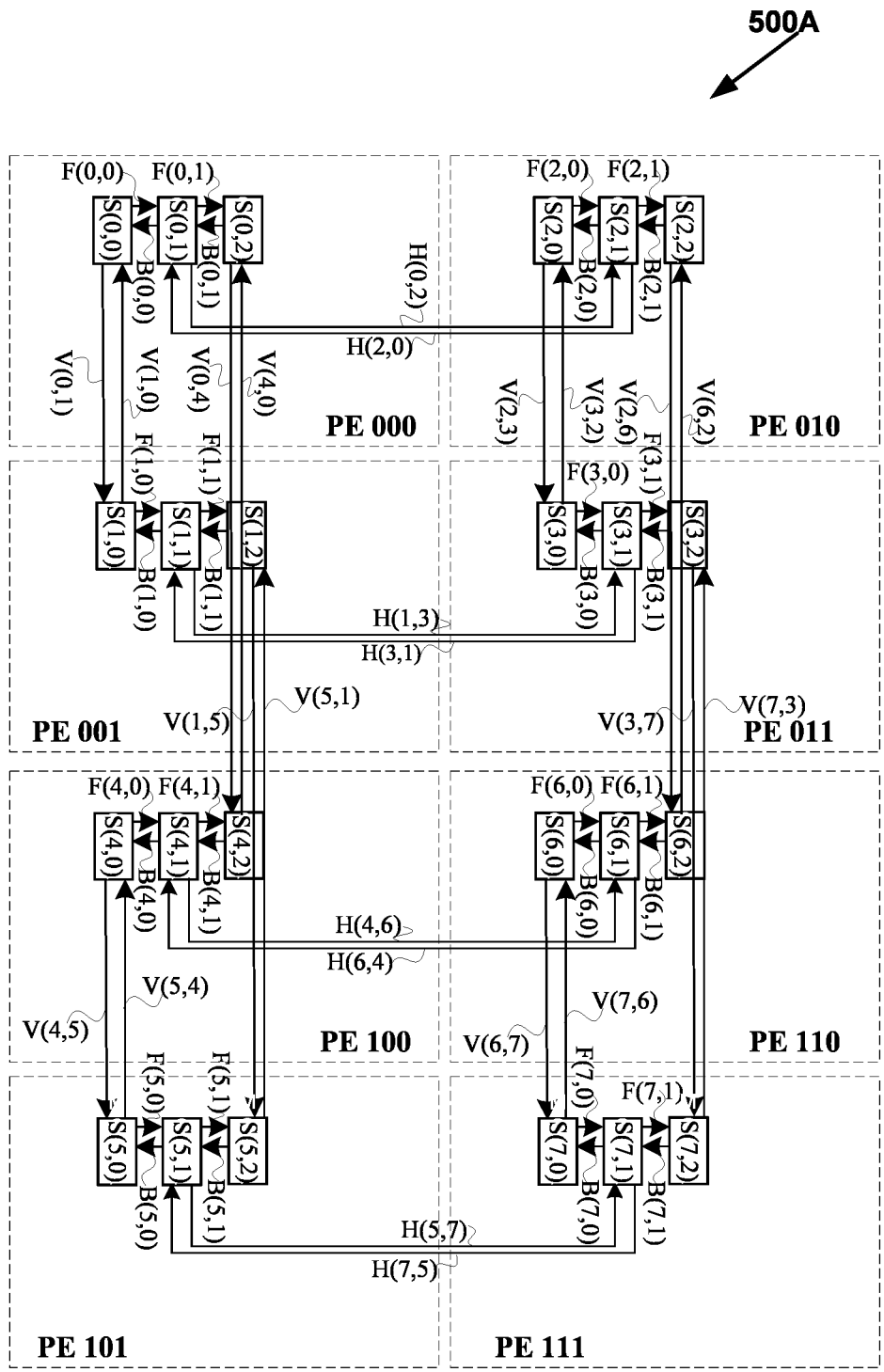
FIG. 5A is a diagram 500A of an exemplary multi-stage hypercube-based interconnection network with 4*2 2D-grid of PEs connected in pyramid configuration for scalable distributed computing system with deterministic communication, in accordance with the invention.

Referring to diagram 500A in FIG. 5A, in one embodiment, an exemplary multi-stage hypercube-based interconnection network between 8 PEs arranged in 4*2 grid where the number of rows is four and the number of columns is two. The 8 PEs are represented in binary format namely PE 000, PE 001, PE 010, PE 011, PE 100, PE 101, PE 110, and PE 111, since 3 bits are needed to represent 8 numbers and the corresponding decimal format being PE 0, PE 1, PE 2, PE 3, PE 4, PE 5, PE 6, and PE 7 respectively.

Each PE comprises three switches and each switch comprises one inlet bus and outlet bus. For example PE 0000 has three switches namely S(0,0), S(0,1), and S(0,2). Each of the three switches in each PE comprise one inlet bus and outlet bus as shown in diagram 500B of FIG. 5B. For example in PE 000, switch S(0,0) comprises inlet bus I(0,0) and outlet bus 0(0,0). Switch S(0,1) comprises inlet bus 40,1) and outlet bus 0(0,1). Switch S(0,2) comprises inlet bus I(0,2) and outlet bus 0(0,2). For simplicity of illustration the inlet buses and outlet buses to each switch of each PE are not shown in diagram 500A of FIG. 5A. Accordingly with the addition of inlet buses and outlet buses illustrated in diagram 500B of FIG. 5B to diagram 500A of FIG. 5A completes the multi-stage hypercube-based interconnection network between 8 PEs arranged in 4*2 grid, in accordance with the current invention.

F(0,0) is a forward bus connected from S(0,0) to S(0,1). F(0,1) is forward bus connected from S(0,1) to S(0,2). B(0,0) is a backward bus connected from S(0,1) to S(0,0). B(0,1) is backward bus connected from S(0,2) to S(0,1).

Applicant notes that the PEs are connected as a binary hypercube network, in accordance with the current invention. The degree of the multi-stage hypercube-based interconnection network disclosed in diagram 500A of FIG. 5A is three.

In the multi-stage hypercube-based interconnection network diagram 500A of FIG. 5, since all the 8 PEs are represented by 3 bits each, each PE is connected, by buses in both the directions, to three other PEs where the PE number differs in only one bit. For example PE 000 number being 000 the three PEs it is connected to are 1) PE 001 where the least significant bit is different, 2) PE 010 where the second least significant bit is different, and 3) PE 100 where the most significant bit is different. Also switch S(0,0) in PE 000 is connected to switch S(1,0) in PE 001 by vertical bus V(0,1) and switch S(1,0) in PE 001 is connected to switch S(0,0) in PE 000 by vertical bus V(1,0). Switch (0,1) in PE 000 is connected to switch S(2,1) in PE 010 by horizontal bus H(0,2) and switch S(2,1) in PE 010 is connected to switch S(0,1) in PE 000 by horizontal bus H(2,0). Switch S(0,2) in PE 000 is connected to switch S(4,2) in PE 100 by vertical bus V(0,4) and switch S(4,2) in PE 100 is connected to switch S(0,2) in PE 000 by vertical bus V(4,0).

Scalable multi-stage hypercube-based interconnection network with 2D-grid of PEs with buses connected in pyramid network configuration (Total number of PEs is not a perfect power of 2):

Now multi-stage hypercube-based interconnection network for 2D-grid where number of PEs is non-perfect power of 2 are disclosed. Referring to diagram 600A in FIG. 6A, in one embodiment, an exemplary multi-stage hypercube-based interconnection network between 12 PEs arranged in 4*3 grid where the number of rows is four and the number of columns is three. Number 12 is not a perfect power of 2. First the next biggest perfect power of 2 for 12 (or equivalently smallest of all bigger perfect powers of 2 greater than 12) which is 16 PEs network is built. As illustrated in diagram 100A of FIG. 1A, multi-stage hypercube-based interconnection network between 16 PEs arranged in 4*4 grid is built first. And then the PEs in the fourth column are removed with all the switches in them. All the vertical and horizontal buses connected to and connected from the PEs in the fourth column are also removed, as shown in diagram 600A of FIG. 6A. The degree of the multi-stage hypercube-based interconnection network disclosed in diagram 600A of FIG. 6A is four since it requires 4 bits to represent all the PEs.

In general a×b processing elements are numbered with a representation in binary format having n bits, where $2^{n-1} < a \times b \leq 2^n$ and where n is a positive number. In diagram 600A of FIG. 6A and diagram 600B of FIG. 6B, a=4, b=3, according to the current invention, it requires n=4 bits since $2^3 < 12 \leq 2^4$.

Figure 6A:
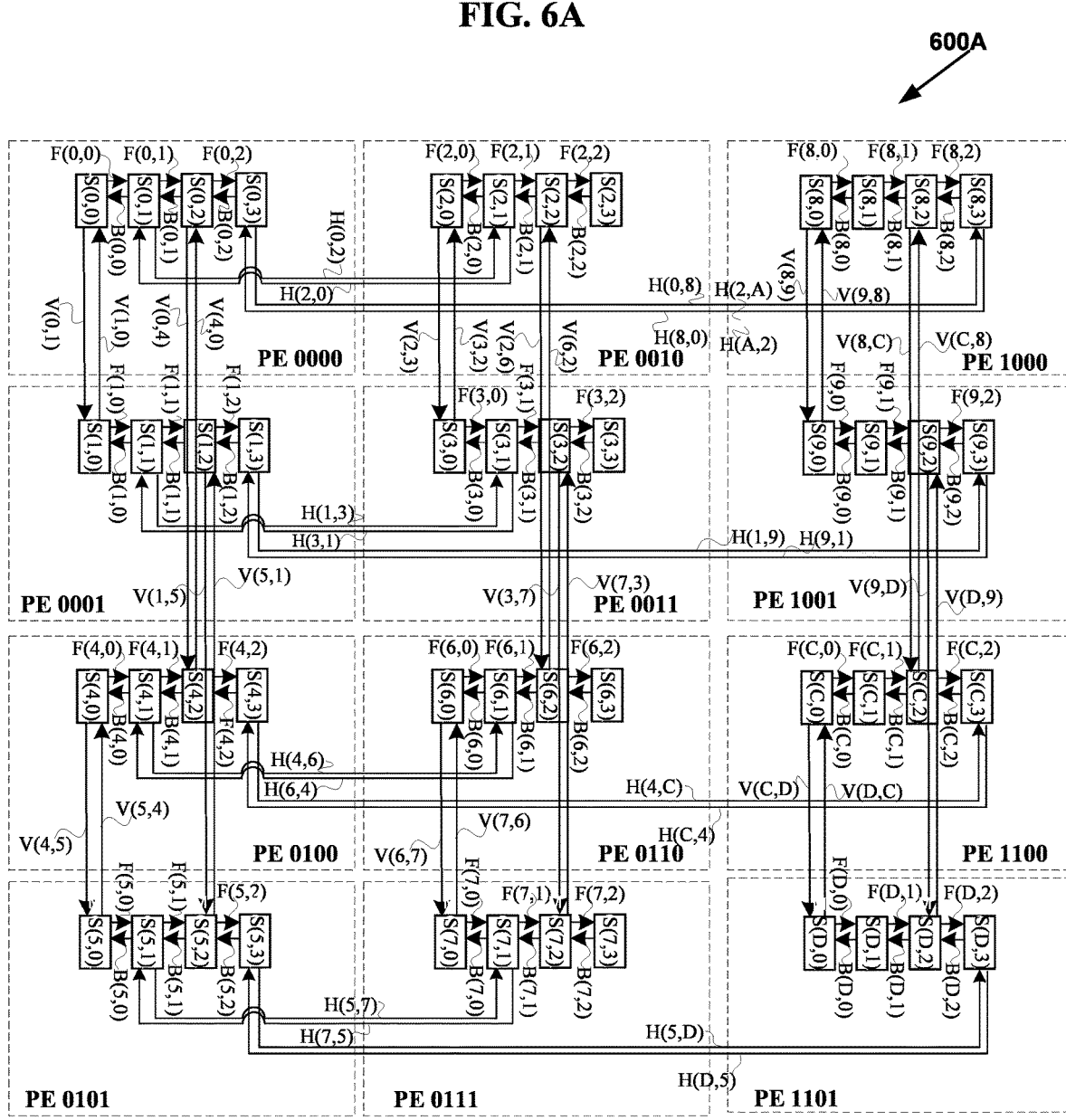
FIG. 6A is a diagram 600A of an exemplary multi-stage hypercube-based interconnection network with 4*3 2D-grid of PEs connected in pyramid configuration for scalable distributed computing system with deterministic communication, in accordance with the invention.

Just like in diagram 100A of FIG. 1A and diagram 100B of FIG. 1B, for simplicity of illustration the inlet buses and outlet buses to each switch of each PE are not shown in diagram g00A of FIG. 6A. Accordingly with the addition of inlet buses and outlet buses illustrated in diagram 600B of FIG. 6B to diagram 600A of FIG. 6A completes the multi-stage hypercube-based interconnection network between 12 PEs arranged in 4*3 grid, in accordance with the current invention.

Applicant notes that in this embodiment the key aspects of multi-stage hypercube-based interconnection network between 2 PEs arranged in 4*3 grid are: 1) the numbering of PEs in 4*3 2D-grid is consistent with the numbering of PEs in 4*4 2D-grid. That is even though there are only 12 PEs in 4*3 grid, the PE number in the third row and third column is PE 1100 and the PE number in the fourth row and third column is PE 1101 with the decimal equivalent of them being 12 and 13 respectively. They are not changed to 1010 and 1011 which are 10 and 11 respectively. This will preserve the bus connecting pattern in binary hypercube as disclosed earlier which is a PE is connected to another if there is only one bit different in their binary format. 2) Each PE in the 4*3 2D-grid still has 4 switches, just the same way 4*4 2D-grid of PEs as illustrated in diagram 1 of FIG. 1A. This will preserve the same binary hypercube properties of 4*4 2D-grid. This will also greatly benefit the software to be simple to program; and 3) Some of the PEs have 4 buses connected to and 4 buses connected from other PEs, for example PE 0000. Some other PEs have 3 buses connected to and 3 buses connected from other PEs, for example PE 0010.

Now multi-stage hypercube-based interconnection network for 2D-grid where number of PEs is non-perfect power of 2 and 2D-grid is a square grid are disclosed. Referring to diagram 700A in FIG. 7A, in one embodiment, an exemplary multi-stage hypercube-based interconnection network between 9 PEs arranged in 3*3 grid where the number of rows is three and the number of columns is three. Number 9 is not a perfect power of 2. First the next biggest perfect power of 2 for 9 (or equivalently smallest of all bigger perfect powers of 2 greater than 9) which is 16 PEs network is built. As illustrated in diagram 100A of FIG. 1A, multi-stage hypercube-based interconnection network between 16 PEs arranged in 4*4 grid is built first. And then the PEs in the fourth column and fourth row are removed with all the switches in them. All the vertical and horizontal buses connected to and connected from the PEs in the fourth row and fourth column are also removed, as shown in diagram 700A of FIG. 7A. The degree of the multi-stage hypercube-based interconnection network disclosed in diagram 700A of FIG. 7A is four since it requires 4 bits to represent all the PEs.

In general a×b processing elements are numbered with a representation in binary format having n bits, where $2^{n-1} < a \times b \leq 2^n$ and where n is a positive number. In diagram 700A of FIG. 7A and diagram 700B of FIG. 7B, a=3, b=3, in accordance with the current invention, it requires n=4 bits since $2^3 < 9 \leq 2^4$.

Figure 7A:
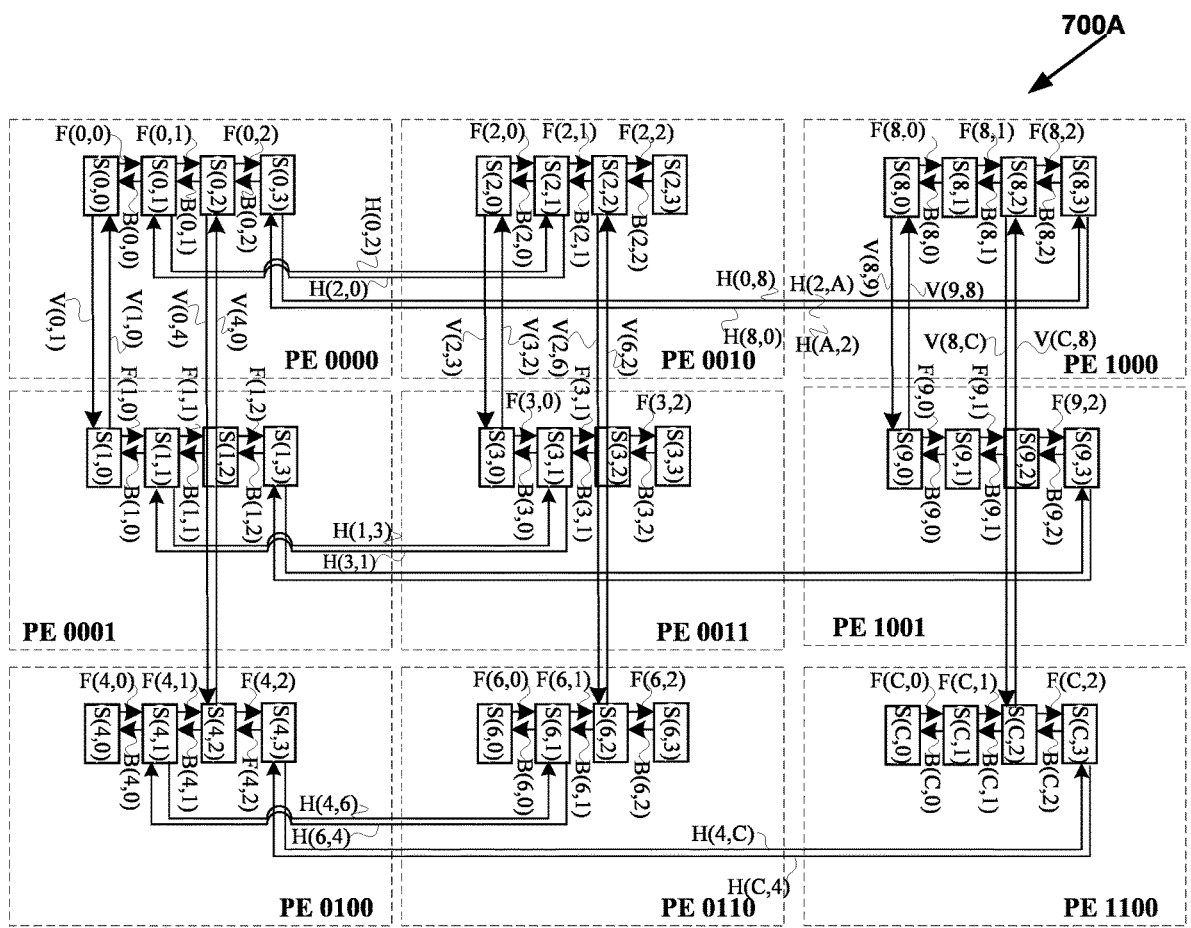
FIG. 7A is a diagram 700A of an exemplary multi-stage hypercube-based interconnection network with 3*3 2D-grid of PEs connected in pyramid configuration for scalable distributed computing system with deterministic communication, in accordance with the invention.

Just like in diagram 100A of FIG. 1A and diagram 100B of FIG. 1B, for simplicity of illustration the inlet buses and outlet buses to each switch of each PE are not shown in diagram g00A of FIG. 7A. Accordingly with the addition of inlet buses and outlet buses illustrated in diagram 700B of FIG. 7B to diagram 700A of FIG. 7A completes the multi-stage hypercube-based interconnection network between 9 PEs arranged in 3*3 grid, in accordance with the current invention.

Applicant notes that in this embodiment the key aspects of multi-stage hypercube-based interconnection network between 2 PEs arranged in 3*3 grid are: 1) the numbering of PEs in 3*3 2D-grid is consistent with the numbering of PEs in 4*4 2D-grid. That is even though there are only 9 PEs in 3*3 grid, the PE number in the third row and second column is PE 1001 and the PE number in the third row and third column is PE 1100 with the decimal equivalent of them being 9 and 12 respectively. They are not changed to 0101 and 0111 which are 5 and 7 respectively. Again this will preserve the bus connecting pattern in binary hypercube as disclosed earlier which is a PE is connected to another if there is only one bit different in their binary format. 2) Each PE in the 3*3 2D-grid still has 4 switches, just the same way 4*4 2D-grid of PEs as illustrated in diagram 1 of FIG. 1A. This will preserve the same binary hypercube properties of 4*4 2D-grid. This will greatly benefit the software to be simple to program; and 3) Some of the PEs have 4 buses connected to and 4 buses connected from other PEs, for example PE 0000. Some other PEs have 3 buses connected to and 3 buses connected from other PEs, for example PE 0010. Some other PEs have 2 buses connected to and 2 buses connected from other PEs, for example PE 1001.

Figure 8:
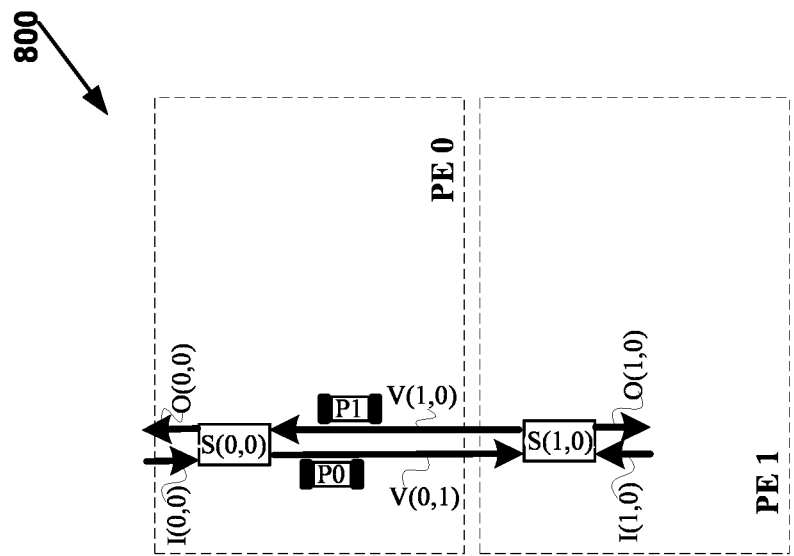
FIG. 8 is a diagram 800 of illustration of deterministic concurrent broadcast by all PEs in one time step in an exemplary multi-stage hypercube-based interconnection network with 2*1 2D-grid of PEs connected in pyramid configuration for scalable distributed computing system with deterministic communication, in accordance with the invention.

Deterministic concurrent broadcast by all PEs in one time step in an exemplary multi-stage hypercube-based interconnection network with 2*1 2D-grid of PEs:

Referring to diagram 800 of FIG. 8 illustrates of deterministic concurrent broadcast by all PEs in one time step in the exemplary multi-stage hypercube-based interconnection network with 2*1 2D-grid of PEs shown in diagram 300 of FIG. 3. PE 0 has packet P0 and PE 1 has packet P1 to broadcast to the rest of PEs. That is each PE needs to transmit its packet to only one other PE. In time step 1, Packet PO is unicasted from PE 0 to PE 1 via inlet bus I(0,0), switch S(0,0), vertical bus V(0,1), switch S(1,0), and outlet bus O(1,0). Concurrently in time step 1, Packet P1 is unicasted from PE 1 to PE 0 via inlet bus I(1,0), switch S(1,0), vertical bus V(1,0), switch S(0,0), and outlet bus O(0,0). A time step is certain time duration determined by the length of the packet, the length of the bus, the number of wires in the inlet buses, outlet buses and vertical buses, the implemented non-transitory medium of each bus and clock speed of operation.

So in the multi-stage hypercube-based interconnection network with 2*1 2D-grid of PEs shown in diagram 800 of FIG. 8, for concurrent broadcast by each of the two PEs to transmit a packet to the other PE, it takes one time step. Since the interconnection network is non-blocking, as illustrated in diagram 800 of FIG. 8, no queuing of packets is needed and no collisions will occur. Also all the vertical buses i.e. the two vertical buses are completely and concurrently utilized.

To broadcast "n" number of packets by each PE to the rest of the PEs, it requires "n" number of time steps in the exemplary multi-stage hypercube-based interconnection network with 2*1 2D-grid of 2 PEs shown in diagram 300 of FIG. 3. In one embodiment, applicant notes that all "n" packets from PE 0 will be transmitted to PE 1 in the same fixed path as packet P0 as illustrated in diagram 800 of FIG. 8. Similarly all "n" packets from PE 1 will be transmitted to PE 0 in the same path as packet P1 as illustrated in diagram 800 of FIG. 8.

Applicant also notes that "n" number of packets from PE 0 will reach PE 1 in the order they are transmitted and similarly "n" number of packets from PE 1 will reach PE 0 in the order they are transmitted. Accordingly to concurrently broadcast "n" number of packets by PE 0 to PE 1 and PE 1 to PE 0, in the exemplary multi-stage hypercube-based interconnection network with 2*1 2D-grid of 2 PEs shown in diagram 300 of FIG. 3, it requires "n" number of time steps and no out of order arrival of packets occurs.

Figure 9A:
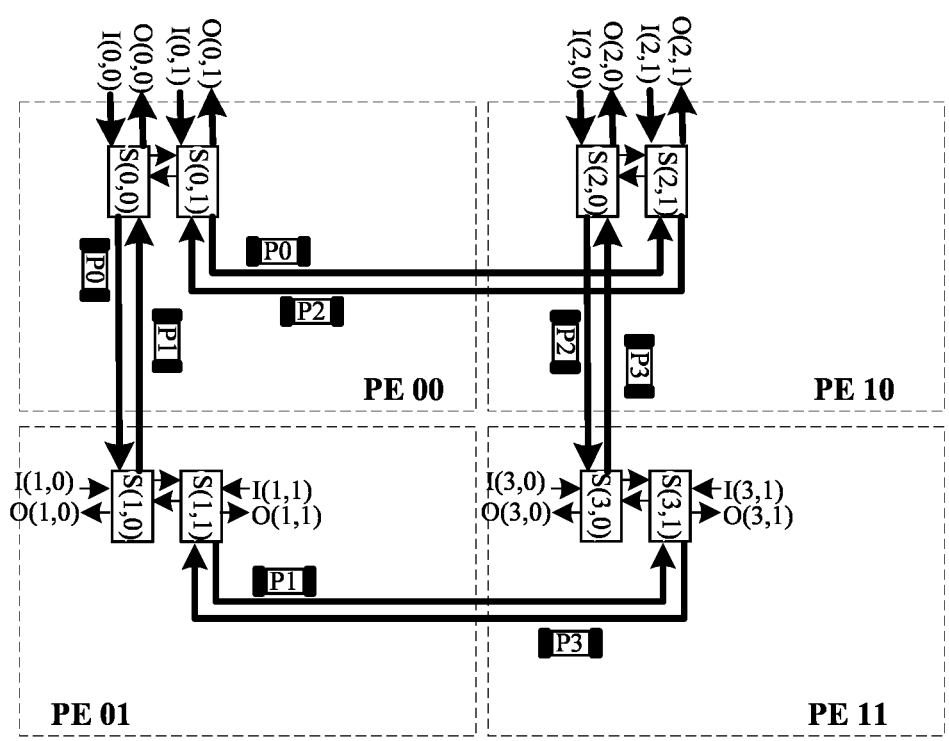
FIG. 9A is a diagram 900A of illustration of time step 1 of deterministic concurrent broadcast by all PEs in two time steps in an exemplary multi-stage hypercube-based interconnection network with 2*2 2D-grid of PEs connected in pyramid configuration for scalable distributed computing system with deterministic communication, in accordance with the invention.
Figure 9B:
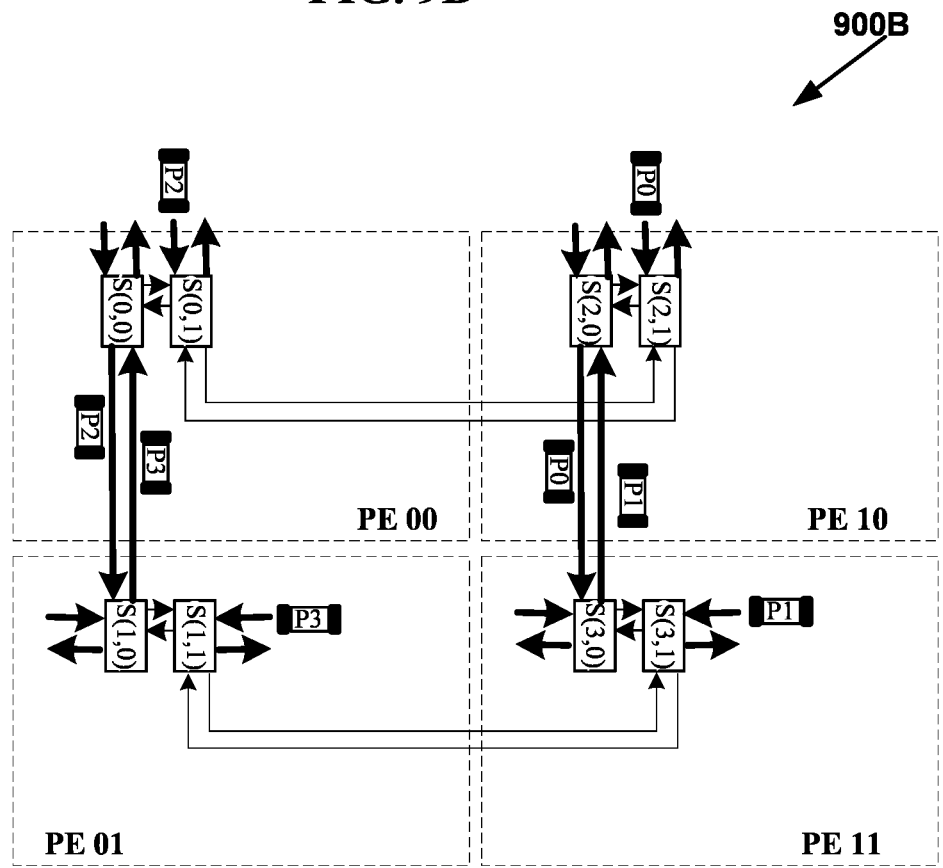
FIG. 9B is a diagram 900B of illustration of time step 2 of deterministic concurrent broadcast by all PEs in two time steps in an exemplary multi-stage hypercube-based interconnection network with 2*2 2D-grid of PEs connected in pyramid configuration for scalable distributed computing system with deterministic communication, in accordance with the invention.

Diagrams 900A of FIG. 9A and 900B of FIG. 9B illustrate deterministic concurrent broadcast by all PEs in two time steps in the exemplary multi-stage hypercube-based interconnection network with 2*2 2D-grid of 4 PEs shown in diagram 400 of FIG. 4. PE 00 has packet P0, PE 01 has packet P1, PE 10 has packet P2, and PE 11 has packet P3 to broadcast to rest of the PEs. As shown in diagram 900A of FIG. 9A, in time step 1, Packet P0 is multicasted with fan out 2 from PE 00 to PE 01 and 10. From PE 00 to PE 01 the path is via inlet bus I(0,0), switch S(0,0), vertical bus V(0,1), switch S(1,0), and outlet bus O(1,0). From PE 00 to PE 10 the path is via inlet bus I(0,0), switch S(0,0), forward bus F(0,0), switch S(0,1), horizontal bus H(0,2), switch S(2,1), and outlet bus O(2,1). Concurrently in time step 1, Packet P1 is multicasted with fan out 2 from PE 01 to PE 00 and PE 10. From PE 01 to PE 00 the path is via inlet bus I(1,0), switch S(1,0), vertical bus V(1,0), switch S(0,0), and outlet bus O(0,0). From PE 01 to PE 11 the path is via inlet bus I(1,0), switch S(1,0), forward bus F(1,0), switch S(1,1), horizontal bus H(1,2), switch S(2,1), and outlet bus 0(2,1).

As shown in diagram 900A of FIG. 9A, in time step 1, Packet P2 is multicasted with fan out 2 from PE 10 to PE 11 and PE 00. From PE 10 to PE 11 the path is via inlet bus I(2,0), switch S(2,0), vertical bus V(2,3), switch S(3,0), and outlet bus O(3,0). From PE 10 to PE 00 the path is via inlet bus I(2,0), switch S(2,0), forward bus F(2,0), switch S(2,1), horizontal bus H(2,0), switch S(0,1), and outlet bus O(0,1). Concurrently in time step 1, Packet P3 is multicasted with fan out 2 from PE 11 to PE 10 and PE 01. From PE 11 to PE 10 the path is via inlet bus I(3,0), switch S(3,0), vertical bus V(3,2), switch S(2,0), and outlet bus O(2,0). From PE 11 to PE 01 the path is via inlet bus I(3,0), switch S(3,0), forward bus F(3,0), switch S(3,1), horizontal bus H(3,1), switch S(1,1), and outlet bus O(1,1).

Also in time step 1, the four vertical buses namely V(0,1), V(1,0), V(2,3) and V(3,2), and the four horizontal buses namely H(0,2), H(2,0), H(1,3) and H(3,1) are concurrently utilized. To summarize in time step 1, PE 00 received packets P1 and P2; PE 01 received packets P0 and P3; PE 10 received packets P0 and P3; and PE 11 received packets P1 and P2.

As shown in diagram 900B of FIG. 9B, in time step 2, Packet P2 is unicasted from PE 00 to PE 01. From PE 00 to PE 01 the path is via inlet bus I(0,1), switch S(0,1), backward bus B(0,0), switch S(0,0), vertical bus V(0,1), switch S(1,0), and outlet bus O(1,0). Concurrently in time step 2, Packet P3 is unicasted from PE 01 to PE 00. From PE 01 to PE 00 the path is via inlet bus I(1,1), switch S(1,1), backward bus B(1,0), switch S(1,0), vertical bus V(1,0), switch S(0,0), and outlet bus O(0,0).

As shown in diagram 900B of FIG. 9B, in time step 2, Packet P0 is unicasted from PE 10 to PE 11. From PE 10 to PE 11 the path is via inlet bus I(2,1), switch S(2,1), backward bus B(2,0), switch S(2,0), vertical bus V(2,3), switch S(3,0), and outlet bus O(3,0). Concurrently in time step 2, Packet P1 is unicasted from PE 11 to PE 10. From PE 11 to PE 10 the path is via inlet bus I(3,1), switch S(3,1), backward bus B(3,0), switch S(3,0), vertical bus V(3,2), switch S(2,0), and outlet bus O(2,0).

Also in time step 2, the four vertical buses namely V(0,1), V(1,0), V(2,3) and V(3,2) are concurrently utilized and the four horizontal buses namely H(0,2), H(2,0), H(1,3) and H(3,1) do not need to be utilized. (Alternatively in another embodiment, instead of vertical buses, the four horizontal buses namely H(0,2), H(2,0), H(1,3) and H(3,1) can be concurrently utilized without needing to utilize the four vertical buses namely V(0,1), V(1,0), V(2,3) and V(3,2)). To summarize in time step 2, PE 00 received packet P3; PE 01 received packet P2; PE 10 received packet P1; and PE 11 received packet P0.

As shown in diagram 900A of FIG. 9A and diagram 900B of FIG. 9B, the path for Packet P0 to transmit from PE 00 to PE 11 is via PE 10. Specifically, as shown in diagram 900A of FIG. 9A, in time step 1, Packet PO is multicasted with fan out 2 from PE 00 to PE 01 and PE 10. From PE 00 to PE 01 the path is via inlet bus I(0,0), switch S(0,0), vertical bus V(0,1), switch S(1,0), and outlet bus O(1,0). From PE 00 to PE 10 the path is via inlet bus I(0,0), switch S(0,0), forward bus F(0,0), switch S(0,1), horizontal bus H(0,2), switch S(2,1), and outlet bus O(2,1). Then as shown in diagram 900B of FIG. 9B, in time step 2, Packet P0 is unicasted from PE 10 to PE 11. From PE 10 to PE 11 the path is via inlet bus I(2,1), switch S(2,1), backward bus B(2,0), switch S(2,0), vertical bus V(2,3), switch S(3,0), and outlet bus O(3,0). In this example, in the path for P0 to transmit from PE 00 to PE 11, PE 00 is hereinafter referred to as source processing element, PE 11 is hereinafter referred to as target processing element and PE 10 is hereinafter referred to as intermediate processing element. In general, with a×b processing elements arranged in two dimensional grid according to the current invention, in the path of a packet from a source processing element to a target processing element there will be one or more intermediate processing elements.

So in the multi-stage hypercube-based interconnection network with 2*2 2D-grid of PEs shown in diagram 900A of FIG. 9A and diagram 900B of FIG. 9B, for concurrent broadcast by each of the four PEs to transmit a packet to all the rest of the PEs, it takes two time steps. Since the interconnection network is non-blocking, as illustrated in diagram 900A of FIG. 9A and diagram 900B of FIG. 9B, no queuing of packets is needed and no collisions will occur. Also the four vertical buses and the four horizontal buses are concurrently utilized in time step 1 where as in time step 2 only the four vertical buses are needed. A time step is certain time duration determined by the length of the packet, the length of the bus, the number of wires in the inlet buses, outlet buses and vertical buses, the implemented non-transitory medium of each bus and clock speed of operation.

To broadcast "n" number of packets by each PE to the rest of the PEs, it requires 2*n number of time steps in the exemplary multi-stage hypercube-based interconnection network with 2*2 2D-grid of 4 PEs shown in diagram 400 of FIG. 4. In one embodiment, applicant notes that all "n" packets from PE 0 will be transmitted to PE 1 in the same fixed path as packet P0 as illustrated in diagram 900A of FIG. 9A and diagram 900B of FIG. 9B. Similarly all "n" packets from PE 0 will be transmitted to PE 2 in the same fixed path as packet P0 as illustrated in diagram 900A of FIG. 9A and diagram 900B of FIG. 9B. Also all "n" packets from PE 0 will be transmitted to PE 3 in the same fixed path as packet P0 as illustrated in diagram 900A of FIG. 9A and diagram 900B of FIG. 9B.

Similarly all "n" packets from PE 1 will be transmitted to PE 0, PE 2, and PE 3 in the same path as packet P1 as illustrated in diagram 900A of FIG. 9A and diagram 900B of FIG. 9B; all "n" packets from PE 2 will be transmitted to PE 0, PE 1, and PE 3 in the same path as packet P2 as illustrated in diagram 900A of FIG. 9A and diagram 900B of FIG. 9B; and all "n" packets from PE 3 will be transmitted to PE 0, PE 1, and PE 2 in the same path as packet P3 as illustrated in diagram 900A of FIG. 9A and diagram 900B of FIG. 9B.

Applicant also notes that "n" number of packets from each PE will reach the rest of PEs in the order they are transmitted as they are transmitted in the same fixed path. For example "n" number of packets from PE 0 will reach PE 1, PE 2 and PE 3 in the order they are transmitted as they are transmitted in the same fixed path as packet P0 as illustrated in diagram 900A of FIG. 9A and diagram 900B of FIG. 9B. Accordingly, concurrent broadcast "n" number of packets from each PE to the rest of PEs, as shown in the exemplary multi-stage hypercube-based interconnection network with 2*2 2D-grid of 4 PEs in diagram 400 of FIG. 4, it requires "2*n" number of time steps and no out of order arrival of packets occurs.

Figure 5B:
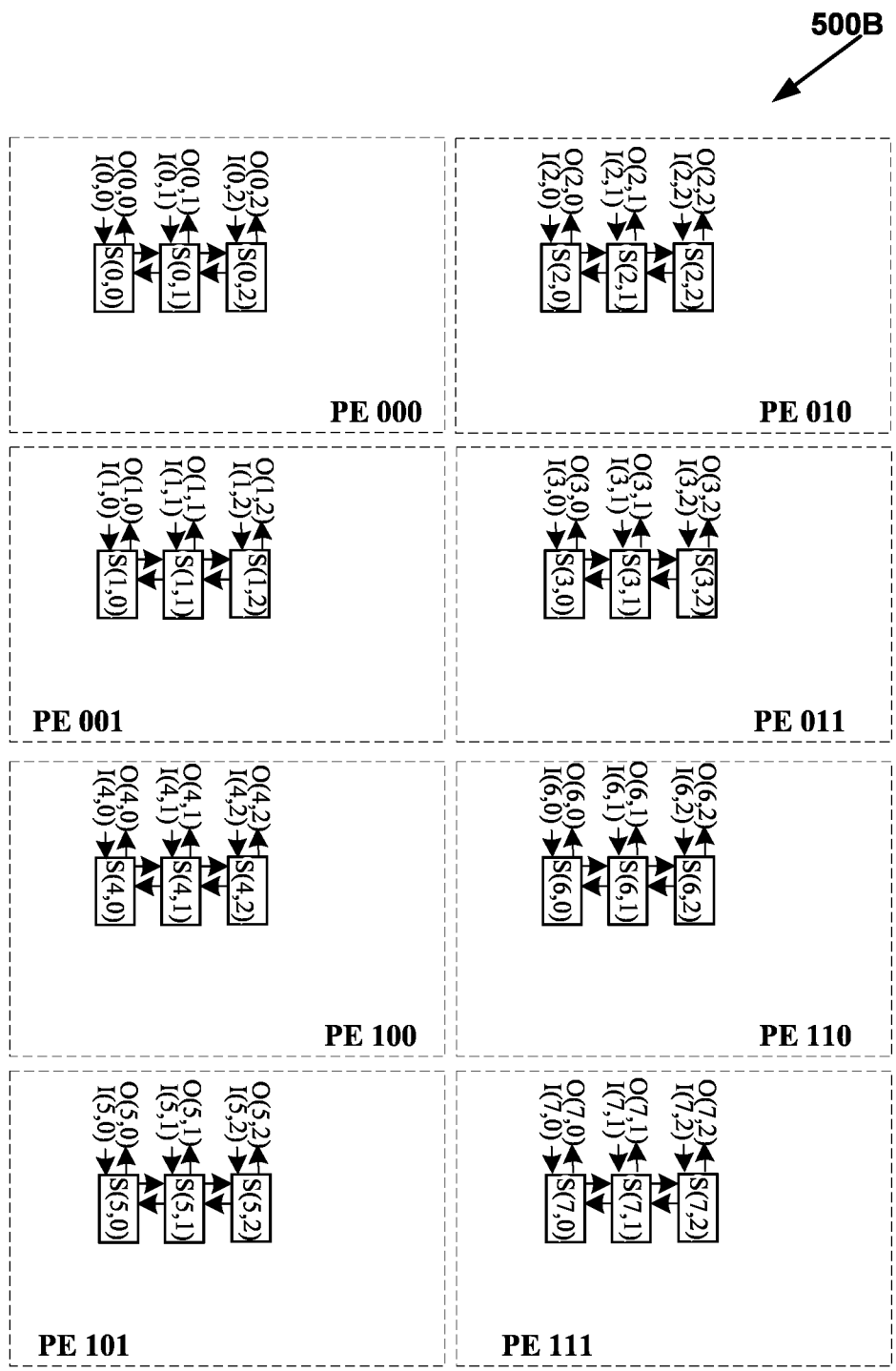
FIG. 5B is a diagram 500B with illustration of inlet buses and outlet buses in each PE of an exemplary multi-stage hypercube-based interconnection network with 4*2 2D-grid of PEs connected in pyramid configuration for scalable distributed computing system with deterministic communication, in accordance with the invention.
Figure 10A:
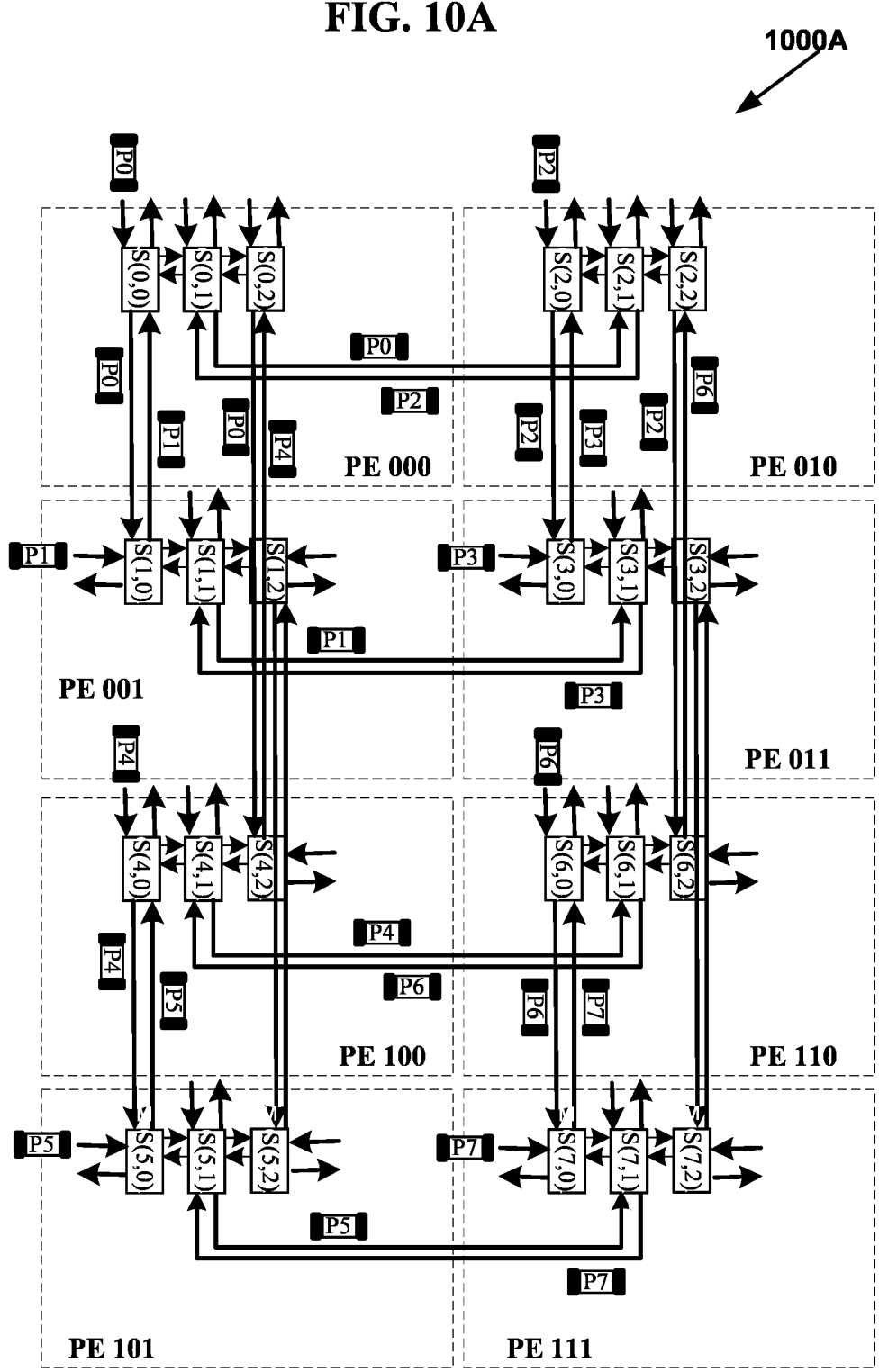
FIG. 10A is a diagram 1000A of illustration of time step 1 of deterministic concurrent broadcast by all PEs in four time steps in an exemplary multi-stage hypercube-based interconnection network with 4*2 2D-grid of PEs connected in pyramid configuration for scalable distributed computing system with deterministic communication, in accordance with the invention.
Figure 10B:
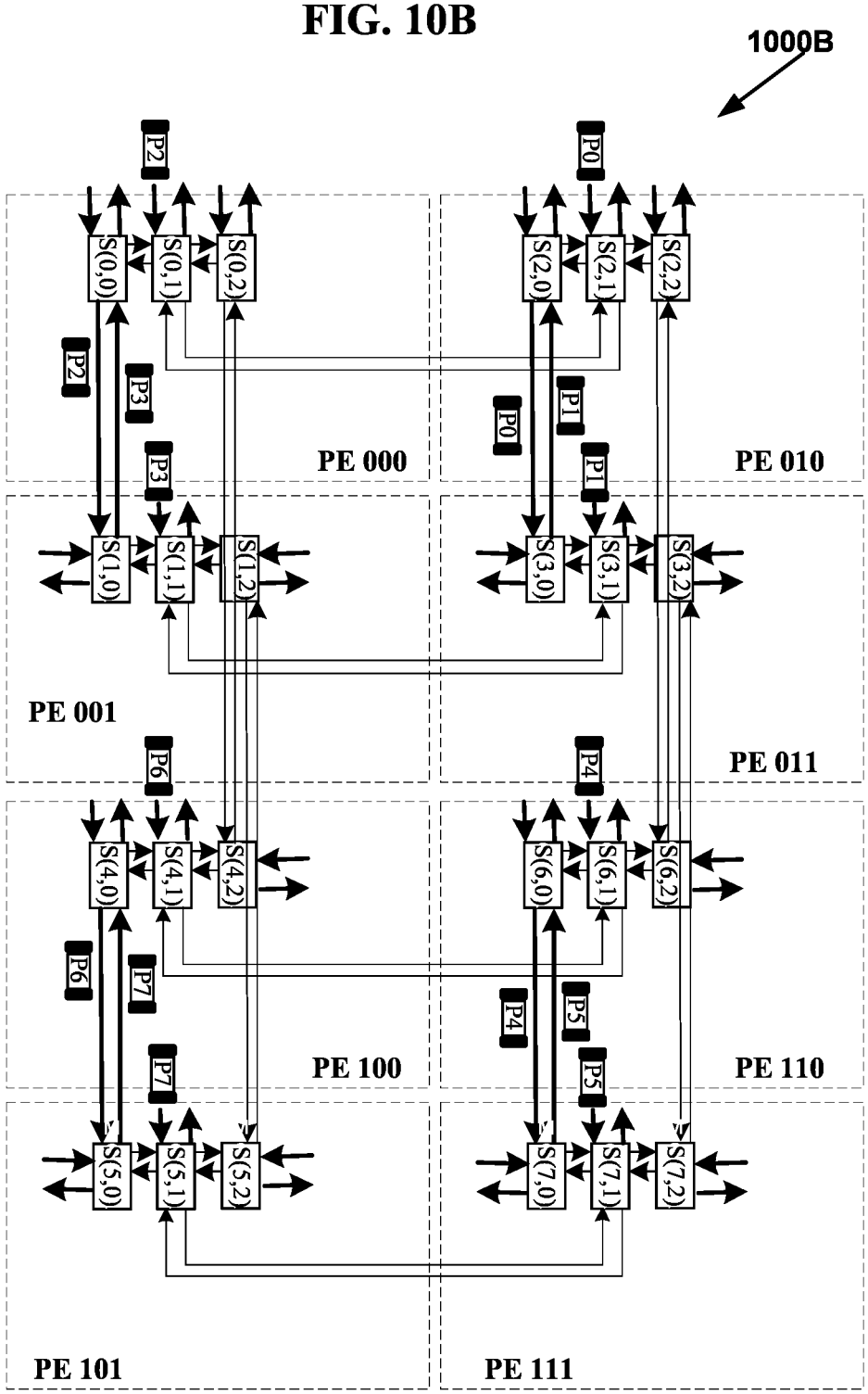
FIG. 10B is a diagram 1000B of illustration of time step 2 of deterministic concurrent broadcast by all PEs in four time steps in an exemplary multi-stage hypercube-based interconnection network with 4*2 2D-grid of PEs connected in pyramid configuration for scalable distributed computing system with deterministic communication, in accordance with the invention.
Figure 10C:
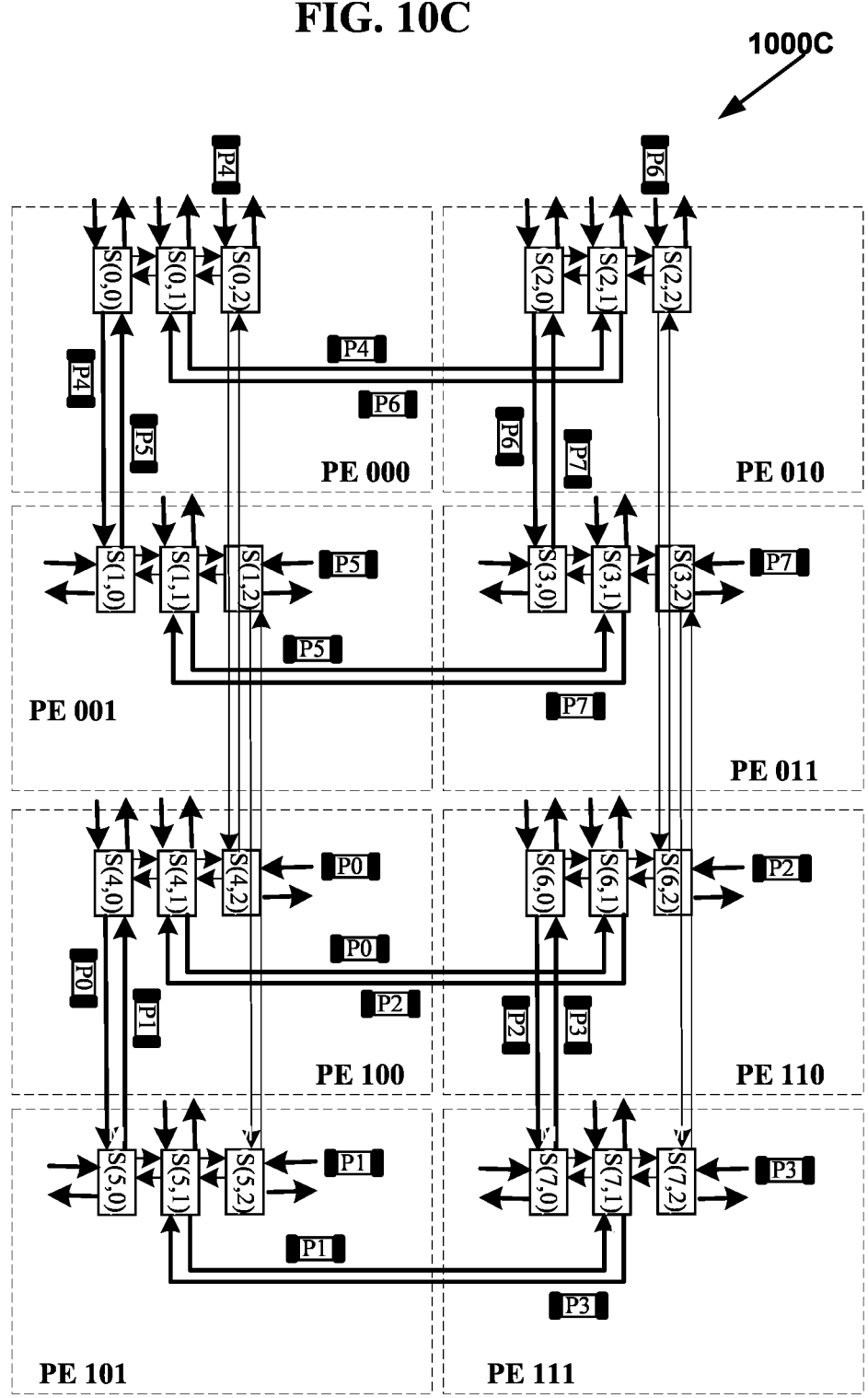
FIG. 10C is a diagram 1000C of illustration of time step 3 of deterministic concurrent broadcast by all PEs in four time steps in an exemplary multi-stage hypercube-based interconnection network with 4*2 2D-grid of PEs connected in pyramid configuration for scalable distributed computing system with deterministic communication, in accordance with the invention.
Figure 10D:
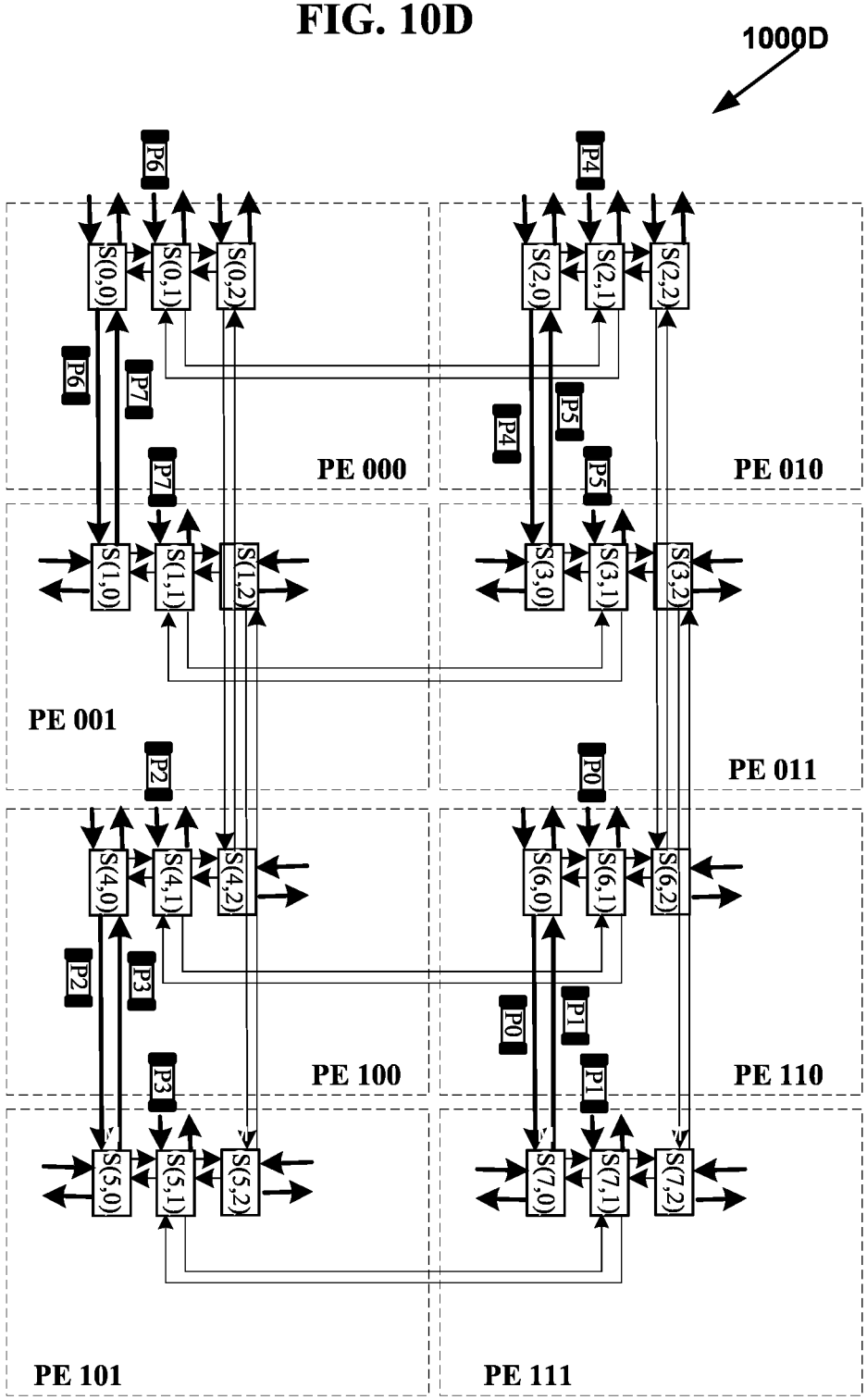
FIG. 10D is a diagram 1000D of illustration of time step 4 of deterministic concurrent broadcast by all PEs in four time steps in an exemplary multi-stage hypercube-based interconnection network with 4*2 2D-grid of PEs connected in pyramid configuration for scalable distributed computing system with deterministic communication, in accordance with the invention.

Referring to diagrams 1000A of FIG. 10A, 1000B of FIG. 10B, 1000C of FIG. 10C, 1000D of FIG. 10D illustrate deterministic concurrent broadcast by all PEs in four time steps in the exemplary multi-stage hypercube-based interconnection network with 4*2 2D-grid of 8 PEs shown in diagram 500A of FIG. 5A and diagram 500B of FIG. 5B.

PE 000 has packet P0, PE 001 has packet P1, PE 010 has packet P2, PE 011 has packet P3, PE 100 has packet P4, PE 101 has packet P5, PE 110 has packet P6, and PE 111 has packet P7 to broadcast to rest of the PEs. As shown in diagram 1000A of FIG. 10A, in time step 1, Packet P0 is multicasted with fan out 3 from PE 000 to PE 001, PE 010, and PE 100. From PE 000 to PE 001 the path is via inlet bus I(0,0), switch S(0,0), vertical bus V(0,1), switch S(1,0), and outlet bus O(1,0). From PE 000 to PE 010 the path is via inlet bus I(0,0), switch S(0,0), forward bus F(0,0), switch S(0,1), horizontal bus H(0,2), switch S(2,1), and outlet bus O(2,1). From PE 000 to PE 100 the path is via inlet bus I(0,0), switch S(0,0), forward bus F(0,0), switch S(0,1), forward bus F(0,1), switch S(0,2), vertical bus V(0,4), switch S(4,2), and outlet bus O(4,2).

Concurrently in time step 1, Packet P1 is multicasted with fan out 3 from PE 001 to PE 000, PE 011, and PE 101. From PE 001 to PE 000 the path is via inlet bus I(1,0), switch S(1,0), vertical bus V(1,0), switch S(0,0), and outlet bus O(0,0). From PE 001 to PE 011 the path is via inlet bus I(1,0), switch S(1,0), forward bus F(1,0), switch S(1,1), horizontal bus H(1,3), switch S(3,1), and outlet bus O(3,1). From PE 001 to PE 101 the path is via inlet bus I(1,0), switch S(1,0), forward bus F(1,0), switch S(1,1), forward bus F(1,1), switch S(1,2), vertical bus V(1,5), switch S(5,2), and outlet bus O(5,2).

As shown in diagram 1000A of FIG. 10A, in time step 1, Packet P2 is multicasted with fan out 3 from PE 010 to PE 011, PE 000, and PE 110. From PE 010 to PE 011 the path is via inlet bus I(2,0), switch S(2,0), vertical bus V(2,3), switch S(3,0), and outlet bus O(3,0). From PE 010 to PE 000 the path is via inlet bus I(2,0), switch S(2,0), forward bus F(2,0), switch S(2,1), horizontal bus H(2,0), switch S(0,1), and outlet bus O(0,1). From PE 010 to PE 110 the path is via inlet bus I(2,0), switch S(2,0), forward bus F(0,0), switch S(2,1), forward bus F(2,1), switch S(2,2), vertical bus V(2,6), switch S(6,2), and outlet bus O(6,2).

Concurrently in time step 1, Packet P3 is multicasted with fan out 3 from PE 011 to PE 010, PE 001, and PE 111. From PE 011 to PE 010 the path is via inlet bus I(3,0), switch S(3,0), vertical bus V(3,2), switch S(2,0), and outlet bus O(2,0). From PE 011 to PE 001 the path is via inlet bus I(3,0), switch S(3,0), forward bus F(3,0), switch S(3,1), horizontal bus H(3,1), switch S(1,1), and outlet bus O(1,1). From PE 011 to PE 111 the path is via inlet bus I(3,0), switch S(3,0), forward bus F(3,0), switch S(3,1), forward bus F(3,1), switch S(3,2), vertical bus V(3,7), switch S(7,2), and outlet bus O(7,2).

As shown in diagram 1000A of FIG. 10A, in time step 1, Packet P4 is multicasted with fan out 3 from PE 100 to PE 101, PE 110, and PE 000. From PE 100 to PE 101 the path is via inlet bus I(4,0), switch S(4,0), vertical bus V(4,5), switch S(5,0), and outlet bus O(5,0). From PE 100 to PE 110 the path is via inlet bus I(4,0), switch S(4,0), forward bus F(4,0), switch S(4,1), horizontal bus H(4,6), switch S(6,1), and outlet bus O(6,1). From PE 100 to PE 000 the path is via inlet bus I(4,0), switch S(4,0), forward bus F(4,0), switch S(4,1), forward bus F(4,1), switch S(4,2), vertical bus V(4,0), switch S(0,2), and outlet bus O(0,2).

Concurrently in time step 1, Packet P5 is multicasted with fan out 3 from PE 101 to PE 100, PE 111, and PE 001. From PE 101 to PE 100 the path is via inlet bus I(5,0), switch S(5,0), vertical bus V(5,4), switch S(4,0), and outlet bus O(4,0). From PE 101 to PE 111 the path is via inlet bus I(5,0), switch S(5,0), forward bus F(5,0), switch S(5,1), horizontal bus H(5,7), switch S(7,1), and outlet bus O(7,1). From PE 101 to PE 001 the path is via inlet bus I(5,0), switch S(5,0), forward bus F(5,0), switch S(5,1), forward bus F(5,1), switch S(5,2), vertical bus V(5,1), switch S(1,2), and outlet bus O(1,2).

As shown in diagram 1000A of FIG. 10A, in time step 1, Packet P6 is multicasted with fan out 3 from PE 110 to PE 111, PE 100, and PE 010. From PE 110 to PE 111 the path is via inlet bus I(6,0), switch S(6,0), vertical bus V(6,7), switch S(7,0), and outlet bus O(7,0). From PE 110 to PE 100 the path is via inlet bus I(6,0), switch S(6,0), forward bus F(6,0), switch S(6,1), horizontal bus H(6,4), switch S(4,1), and outlet bus O(4,1). From PE 110 to PE 010 the path is via inlet bus I(6,0), switch S(6,0), forward bus F(6,0), switch S(6,1), forward bus F(6,1), switch S(6,2), vertical bus V(6,2), switch S(2,2), and outlet bus O(2,2).

Concurrently in time step 1, Packet P7 is multicasted with fan out 3 from PE 111 to PE 110, PE 101, and PE 011. From PE 111 to PE 110 the path is via inlet bus I(7,0), switch S(7,0), vertical bus V(7,6), switch S(6,0), and outlet bus O(6,0). From PE 111 to PE 101 the path is via inlet bus I(7,0), switch S(7,0), forward bus F(7,0), switch S(7,1), horizontal bus H(7,5), switch S(5,1), and outlet bus O(5,1). From PE 111 to PE 011 the path is via inlet bus I(7,0), switch S(7,0), forward bus F(7,0), switch S(7,1), forward bus F(7,1), switch S(7,2), vertical bus V(7,3), switch S(3,2), and outlet bus 0(3,2).

Also in time step 1, the sixteen vertical buses namely V(0,1), V(1,0), V(2,3), V(3,2), V(4,5), V(5,4), V(6,7), V(7,6), V(0,4), V(4,0), V(1,5), V(5,1), V(2,6), V(6,2), V(3,7), and V(7,3) and the eight horizontal buses namely H(0,2), H(2,0), H(1,3), H(3,1), H(4,6), H(6,4), H(5,7) and H(7,5) are completely and concurrently utilized. To summarize in time step 1, PE 000 received packets P1, P2, and P4; PE 001 received packets P0, P3 and P5; PE 010 received packets P0, P3, and P6; PE 011 received packets P1, P2 and P7; PE 100 received packets P5, P6, and P0; PE 101 received packets P4, P7 and P1; PE 110 received packets P4, P7, and P2; and PE 111 received packets P6, P5 and P3.

As shown in diagram 1000B of FIG. 10B, in time step 2, Packet P2 is unicasted from PE 000 to PE 001. From PE 000 to PE 001 the path is via inlet bus I(0,1), switch S(0,1), backward bus B(0,0), switch S(0,0), vertical bus V(0,1), switch S(1,0), and outlet bus O(1,0). Concurrently in time step 2, Packet P3 is unicasted from PE 001 to PE 000. From PE 001 to PE 000 the path is via inlet bus I(1,1), switch S(1,1), backward bus B(1,0), switch S(1,0), vertical bus V(1,0), switch S(0,0), and outlet bus O(0,0).

Concurrently in time step 2, Packet P0 is unicasted from PE 010 to PE 011. From PE 010 to PE 011 the path is via inlet bus I(2,1), switch S(2,1), backward bus B(2,0), switch S(2,0), vertical bus V(2,3), switch S(3,0), and outlet bus O(3,0). Concurrently in time step 2, Packet P1 is unicasted from PE 011 to PE 010. From PE 011 to PE 010 the path is via inlet bus I(3,1), switch S(3,1), backward bus B(3,0), switch S(3,0), vertical bus V(3,2), switch S(2,0), and outlet bus O(2,0).

As shown in diagram 1000B of FIG. 10B, in time step 2, Packet P6 is unicasted from PE 100 to PE 101. From PE 100 to PE 101 the path is via inlet bus I(4,1), switch S(4,1), backward bus B(4,0), switch S(4,0), vertical bus V(4,5), switch S(5,0), and outlet bus O(5,0). Concurrently in time step 2, Packet P7 is unicasted from PE 101 to PE 100. From PE 101 to PE 100 the path is via inlet bus I(5,1), switch S(5,1), backward bus B(5,0), switch S(5,0), vertical bus V(5,4), switch S(4,0), and outlet bus O(4,0).

Concurrently in time step 2, Packet P4 is unicasted from PE 110 to PE 111. From PE 110 to PE 111 the path is via inlet bus I(6,1), switch S(6,1), backward bus B(6,0), switch S(6,0), vertical bus V(6,7), switch S(7,0), and outlet bus O(7,0). Concurrently in time step 2, Packet P5 is unicasted from PE 111 to PE 110. From PE 111 to PE 110 the path is via inlet bus I(7,1), switch S(7,1), backward bus B(7,0), switch S(7,0), vertical bus V(7,6), switch S(6,0), and outlet bus O(6,0).

Also in time step 2, the eight vertical buses namely V(0,1), V(1,0), V(2,3) and V(3,2), V(4,5), V(5,4), V(6,7), and V(7,6) are concurrently utilized. (Alternatively in another embodiment, instead of vertical buses, the four horizontal buses namely H(0,2), H(2,0), H(1,3), H(3,1), H(4,6), H(6,4), H(5,7) and H(7,5) can be concurrently utilized). To summarize in time step 2, PE 000 received packet P3; PE 001 received packet P2; PE 010 received packet P1; PE 011 received packet P0; PE 100 received packet P7; PE 101 received packet P6; PE 110 received packet P5; and PE 111 received packet P4.

As shown in diagram 1000C of FIG. 10C, in time step 3, Packet P4 is multicasted with fan out 2 from PE 000 to PE 001 and PE 010. From PE 000 to PE 001 the path is via inlet bus I(0,2), switch S(0,2), backward bus B(0,1), switch S(0,1), backward bus B(0,0), switch S(0,0), vertical bus V(0,1), switch S(1,0), and outlet bus O(1,0). From PE 000 to PE 010 the path is via inlet bus I(0,2), switch S(0,2), backward bus B(0,1), switch S(0,1), horizontal bus H(0,2), switch S(2,1), and outlet bus O(2,1).

Concurrently in time step 3, Packet P5 is multicasted with fan out 2 from PE 001 to PE 000 and PE 011. From PE 001 to PE 000 the path is via inlet bus I(1,2), switch S(1,2), backward bus B(1,1), switch S(1,1), backward bus B(1,0), switch S(1,0), vertical bus V(1,0), switch S(0,0), and outlet bus O(0,0). From PE 001 to PE 011 the path is via inlet bus I(1,2), switch S(1,2), backward bus B(1,1), switch S(1,1), horizontal bus H(1,3), switch S(3,1), and outlet bus O(3,1).

As shown in diagram 1000C of FIG. 10C, in time step 3, Packet P6 is multicasted with fan out 2 from PE 010 to PE 011 and PE 000. From PE 010 to PE 011 the path is via inlet bus I(2,2), switch S(2,2), backward bus B(2,1), switch S(2,1), backward bus B(2,0), switch S(2,0), vertical bus V(2,3), switch S(3,0), and outlet bus O(3,0). From PE 010 to PE 000 the path is via inlet bus I(2,2), switch S(2,2), backward bus B(2,1), switch S(2,1), horizontal bus H(2,0), switch S(0,1), and outlet bus O(0,1).

Concurrently in time step 3, Packet P7 is multicasted with fan out 2 from PE 011 to PE 010 and PE 001. From PE 011 to PE 010 the path is via inlet bus I(3,2), switch S(3,2), backward bus B(3,1), switch S(3,1), backward bus B(3,0), switch S(3,0), vertical bus V(3,2), switch S(2,0), and outlet bus O(2,0). From PE 011 to PE 001 the path is via inlet bus I(3,2), switch S(3,2), backward bus B(3,1), switch S(3,1), horizontal bus H(3,1), switch S(1,1), and outlet bus O(1,1).

As shown in diagram 1000C of FIG. 10C, in time step 3, Packet P0 is multicasted with fan out 2 from PE 100 to PE 101 and PE 110. From PE 100 to PE 101 the path is via inlet bus I(4,2), switch S(4,2), backward bus B(4,1), switch S(4,1), backward bus B(4,0), switch S(4,0), vertical bus V(4,5), switch S(5,0), and outlet bus O(5,0). From PE 100 to PE 110 the path is via inlet bus I(4,2), switch S(4,2), backward bus B(4,1), switch S(4,1), horizontal bus H(4,6), switch S(6,1), and outlet bus O(6,1).

Concurrently in time step 3, Packet P1 is multicasted with fan out 2 from PE 101 to PE 100 and PE 111. From PE 101 to PE 100 the path is via inlet bus I(5,2), switch S(5,2), backward bus B(5,1), switch S(5,1), backward bus B(5,0), switch S(5,0), vertical bus V(5,4), switch S(4,0), and outlet bus O(4,0). From PE 101 to PE 111 the path is via inlet bus I(5,2), switch S(5,2), backward bus B(5,1), switch S(5,1), horizontal bus H(5,7), switch S(7,1), and outlet bus O(7,1).

As shown in diagram 1000C of FIG. 10C, in time step 3, Packet P2 is multicasted with fan out 2 from PE 110 to PE 111 and PE 100. From PE 110 to PE 111 the path is via inlet bus I(6,2), switch S(6,2), backward bus B(6,1), switch S(6,1), backward bus B(6,0), switch S(6,0), vertical bus V(6,7), switch S(7,0), and outlet bus O(7,0). From PE 110 to PE 100 the path is via inlet bus I(6,2), switch S(6,2), backward bus B(6,1), switch S(6,1), horizontal bus H(6,4), switch S(4,1), and outlet bus O(4,1).

Concurrently in time step 3, Packet P3 is multicasted with fan out 2 from PE 111 to PE 110 and PE 101. From PE 111 to PE 110 the path is via inlet bus I(7,2), switch S(7,2), backward bus B(7,1), switch S(7,1), backward bus B(7,0), switch S(7,0), vertical bus V(7,6), switch S(6,0), and outlet bus O(6,0). From PE 111 to PE 101 the path is via inlet bus I(7,2), switch S(7,2), backward bus B(7,1), switch S(7,1), horizontal bus H(7,5), switch S(5,1), and outlet bus O(5,1).

Also in time step 3, the eight vertical buses namely V(0,1), V(1,0), V(2,3), V(3,2), V(4,5), V(5,4), V(6,7), and V(7,6), and the eight horizontal buses namely H(0,2), H(2,0), H(1,3), H(3,1), H(4,6), H(6,4), H(5,7) and H(7,5) are completely and concurrently utilized. To summarize in time step 3, PE 000 received packets P5 and P6; PE 001 received packets P4 and P7; PE 010 received packets P4 and P7; PE 011 received packets P4 and P7; PE 100 received packets P1 and P2; PE 101 received packets P0 and P3; PE 110 received packets P0 and P3; PE 111 received packets P4 and P7.

As shown in diagram 1000D of FIG. 10D, in time step 4, Packet P6 is unicasted from PE 000 to PE 001. From PE 000 to PE 001 the path is via inlet bus I(0,1), switch S(0,1), backward bus B(0,0), switch S(0,0), vertical bus V(0,1), switch S(1,0), and outlet bus O(1,0). Concurrently in time step 4, Packet P7 is unicasted from PE 001 to PE 000. From PE 001 to PE 000 the path is via inlet bus I(1,1), switch S(1,1), backward bus B(1,0), switch S(1,0), vertical bus V(1,0), switch S(0,0), and outlet bus O(0,0).

Concurrently in time step 4, Packet P4 is unicasted from PE 010 to PE 011. From PE 010 to PE 011 the path is via inlet bus I(2,1), switch S(2,1), backward bus B(2,0), switch S(2,0), vertical bus V(2,3), switch S(3,0), and outlet bus O(3,0). Concurrently in time step 4, Packet P5 is unicasted from PE 011 to PE 010. From PE 011 to PE 010 the path is via inlet bus I(3,1), switch S(3,1), backward bus B(3,0), switch S(3,0), vertical bus V(3,2), switch S(2,0), and outlet bus O(2,0).

As shown in diagram 1000D of FIG. 10D, in time step 4, Packet P2 is unicasted from PE 100 to PE 101. From PE 100 to PE 101 the path is via inlet bus I(4,1), switch S(4,1), backward bus B(4,0), switch S(4,0), vertical bus V(4,5), switch S(5,0), and outlet bus O(5,0). Concurrently in time step 4, Packet P3 is unicasted from PE 101 to PE 100. From PE 101 to PE 100 the path is via inlet bus I(5,1), switch S(5,1), backward bus B(5,0), switch S(5,0), vertical bus V(5,4), switch S(4,0), and outlet bus O(4,0).

Concurrently in time step 4, Packet P0 is unicasted from PE 110 to PE 111. From PE 110 to PE 111 the path is via inlet bus I(6,1), switch S(6,1), backward bus B(6,0), switch S(6,0), vertical bus V(6,7), switch S(7,0), and outlet bus O(7,0). Concurrently in time step 4, Packet P1 is unicasted from PE 111 to PE 110. From PE 111 to PE 110 the path is via inlet bus I(7,1), switch S(7,1), backward bus B(7,0), switch S(7,0), vertical bus V(7,6), switch S(6,0), and outlet bus O(6,0).

Also in time step 4, the eight vertical buses namely V(0,1), V(1,0), V(2,3) and V(3,2), V(4,5), V(5,4), V(6,7), and V(7,6) are concurrently utilized. (Alternatively in another embodiment, instead of vertical buses, the four horizontal buses namely H(0,2), H(2,0), H(1,3), H(3,1), H(4,6), H(6,4), H(5,7) and H(7,5) can be concurrently utilized). To summarize in time step 4, PE 000 received packet P7; PE 001 received packet P6; PE 010 received packet P5; PE 011 received packet P4; PE 100 received packet P3; PE 101 received packet P2; PE 110 received packet P1; and PE 111 received packet P0.

In general, with α×b processing elements arranged in two dimensional grid according to the current invention, in the path of a packet from a source processing element to a target processing element there will be one or more intermediate processing elements. Applicant notes that, for example, in diagram 1000A of FIG. 10A, diagram 1000B of FIG. 10B, diagram 1000C of FIG. 1C and diagram 1000D of FIG. 10D, for example in the path of Packet P0 from PE 000 to PE 111, packet P0 traverses from PE 000 to PE 100 to PE 110 to PE 111. In this example, in the path for packet P0, PE 000 is the source processing element; PE 111 is the target processing element; And PE 100, PE 110 are intermediate processing elements.

So in the multi-stage hypercube-based interconnection network with 4*2 2D-grid of PEs shown in diagram 1000A of FIG. 10A, diagram 1000B of FIG. 10B, diagram 1000C of FIG. 1C and diagram 1000D of FIG. 10D, for concurrent broadcast by each of the four PEs to transmit a packet to all the rest of the PEs, it takes four time steps. A time step is certain time duration determined by the length of the packet, the length of the bus, the number of wires in the inlet buses, outlet buses and vertical buses, the implemented non-transitory medium of each bus and clock speed of operation. Since the interconnection network is non-blocking, as illustrated in diagram 1000A of FIG. 10A, diagram 1000B of FIG. 10B, diagram 1000C of FIG. 1C and diagram 1000D of FIG. 10D, no queuing of packets is needed and no collisions will occur.

Also the sixteen vertical buses and the eight horizontal buses are completely and concurrently utilized in time step 1. In time step 2, only eight vertical buses are needed. Only eight vertical buses and eight horizontal buses are concurrently needed in time step 3. In time step 4, only eight vertical buses are needed.

To broadcast "n" number of packets by each PE to the rest of the PEs, it requires 4*n number of time steps in the exemplary multi-stage hypercube-based interconnection network with 4*2 2D-grid of 8 PEs shown in diagram 500A of FIG. 5A and diagram 500B of FIG. 5B.

In one embodiment, applicant notes that all "n" packets from PE 0 will be transmitted to PE 1 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 2 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 3 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 4 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 5 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 6 in the same fixed path as packet P0 as illustrated in diagram 1000A of FIG. 10A, diagram 1000B of FIG. 10B, diagram 1000C of FIG. 1C and diagram 1000D of FIG. 10D; And all "n" packets from PE 0 will be transmitted to PE 7 in the same fixed path as packet P0 as illustrated in diagram 1000A of FIG. 10A, diagram 1000B of FIG. 10B, diagram 1000C of FIG. 1C and diagram 1000D of FIG. 10D.

Similarly all "n" packets from PE 1 will be transmitted to PE 0, PE 2, PE 3, PE 4, PE 5, PE 6 and PE 7 in the same path as packet P1 as illustrated in diagram 1000A of FIG. 10A, diagram 1000B of FIG. 10B, diagram 1000C of FIG. 1C and diagram 1000D of FIG. 10D; All "n" packets from PE 2 will be transmitted to PE 0, PE 1, PE 3, PE 4, PE 5, PE 6 and PE 7 in the same path as packet P2 as illustrated in diagram 1000A of FIG. 10A, diagram 1000B of FIG. 10B, diagram 1000C of FIG. 1C and diagram 1000D of FIG. 10D; All "n" packets from PE 3 will be transmitted to PE 0, PE 1, PE 2, PE 4, PE 5, PE 6 and PE 7 in the same path as packet P3 as illustrated in diagram 1000A of FIG. 10A, diagram 1000B of FIG. 10B, diagram 1000C of FIG. 1C and diagram 1000D of FIG. 10D; All "n" packets from PE 4 will be transmitted to PE 0, PE 1, PE 2, PE 3, PE 5, PE 6 and PE 7 in the same path as packet P4 as illustrated in diagram 1000A of FIG. 10A, diagram 1000B of FIG. 10B, diagram 1000C of FIG. 1C and diagram 1000D of FIG. 10D; All "n" packets from PE 5 will be transmitted to PE 0, PE 1, PE 2, PE 3, PE 4, PE 6 and PE 7 in the same path as packet P5 as illustrated in diagram 1000A of FIG. 10A, diagram 1000B of FIG. 10B, diagram 1000C of FIG. 1C and diagram 1000D of FIG. 10D; All "n" packets from PE 6 will be transmitted to PE 0, PE 1, PE 2, PE 3, PE 4, PE 5 and PE 7 in the same path as packet P6 as illustrated in diagram 1000A of FIG. 10A, diagram 1000B of FIG. 10B, diagram 1000C of FIG. 1C and diagram 1000D of FIG. 10D; And all "n" packets from PE 7 will be transmitted to PE 0, PE 1, PE 2, PE 3, PE 4, PE 5 and PE 6 in the same path as packet P7 as illustrated in diagram 1000A of FIG. 10A, diagram 1000B of FIG. 10B, diagram 1000C of FIG. 1C and diagram 1000D of FIG. 10D;

Applicant also notes that "n" number of packets from each PE will reach the rest of PEs in the order they are transmitted as they are transmitted in the same fixed path. For example "n" number of packets from PE 0 will reach PE 1, PE 2, PE 3, PE 4, PE 5, PE 6 and PE 7 in the order they are transmitted as they are transmitted in the same fixed path as packet PO as illustrated in diagram 1000A of FIG. 10A, diagram 1000B of FIG. 10B, diagram 1000C of FIG. 1C and diagram 1000D of FIG. 10D. Accordingly, concurrent broadcast "n" number of packets from each PE to the rest of PEs, as shown in the exemplary multi-stage hypercube-based interconnection network with 4*2 2D-grid of 8 PEs in diagram 500A of FIG. 5A and diagram 500B of FIG. 5B, it requires "4*n" number of time steps and no out of order arrival of packets occurs.

Applicant also notes that in each PE packets arrive in different order as can be observed in the foregoing disclosure, particularly in diagram 900A of FIG. 9A, diagram 900B of FIG. 9B, diagram 1000A of FIG. 10A, diagram 1000B of FIG. 10B, diagram 1000C of FIG. 1C and diagram 1000D of FIG. 10D. So each processor will be enabled to execute the instructions in the order of the arrival of packets in each PE, which means processor in each PE is based on dataflow architecture. For example PE 000 in the multi-stage hypercube-based interconnection network of diagram 1000A of FIG. 10A, diagram 1000B of FIG. 10B, diagram 1000C of FIG. 1C and diagram 1000D of FIG. 10D, executes instructions requiring P1, P2, P4, P3, P5, P6, and P7 in that order whereas example PE 001 executes instructions requiring P0, P3, P5, P2, P4, P7, and P6 in that order and so both PEs execute the program instructions in different order which is dataflow architecture. Applicant notes that each time step is not the same duration as other time steps as a time duration of a time step is determined by the length of the packet, the length of the bus, the number of wires in the inlet buses, outlet buses and vertical buses, the implemented non-transitory medium of each bus and clock speed of operation. However the packet received sooner is transmitted through the interconnection network so that time steps are interleaved without changing the order of transmission of the packets, according to the current invention.

Also Applicant notes that, in one embodiment, for each PE to one or more fan outs of multicast of a packet to one or more of the rest of PEs in the multi-stage hypercube-based interconnection network, in accordance with the current invention, is performed by concurrent broadcast by each PE to all the rest of PEs in the multi-stage hypercube-based interconnection network as disclosed in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, and diagram 1000D of FIG. 10D.

Figure 6B:
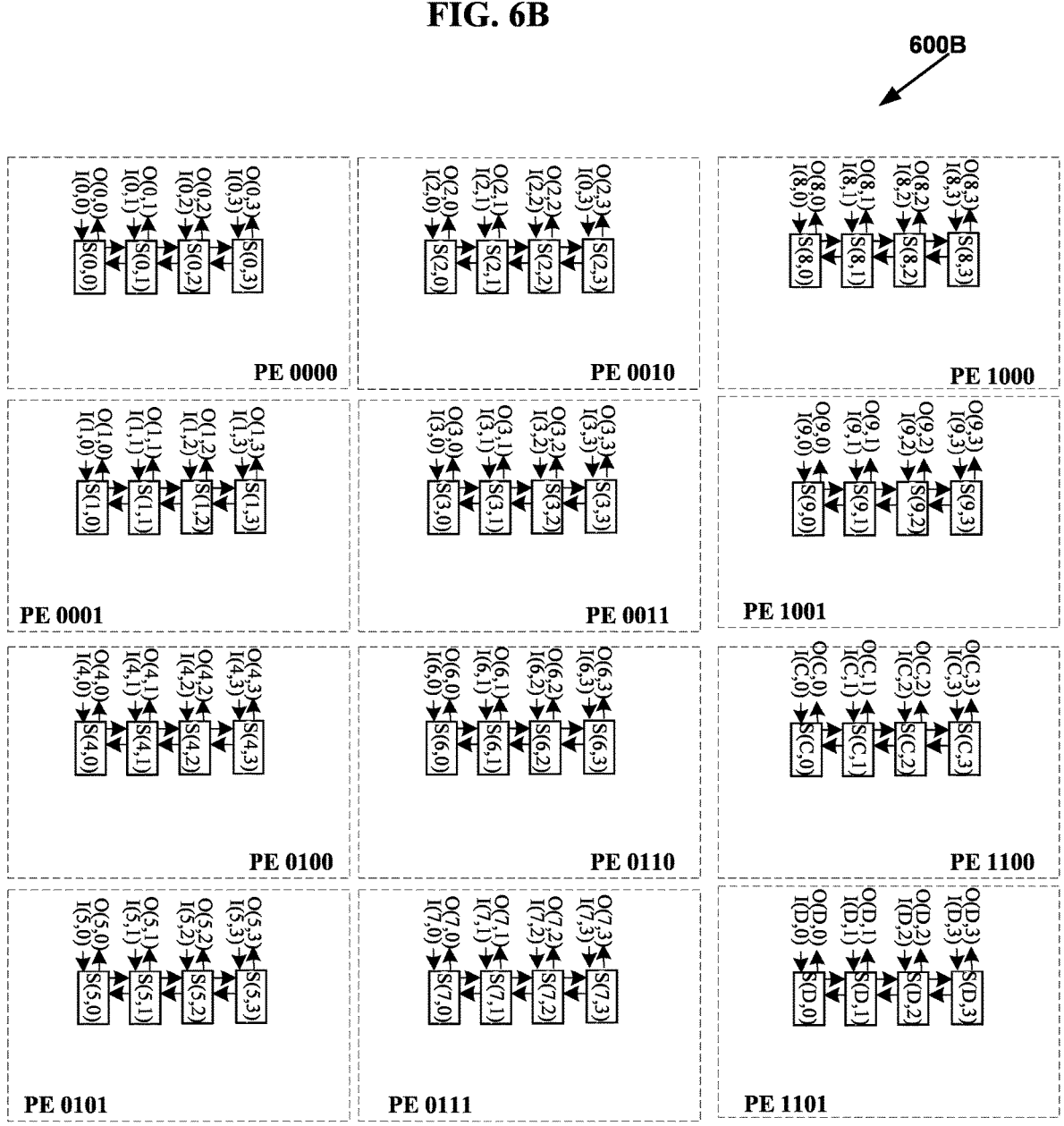
FIG. 6B is a diagram 600B with illustration of inlet buses and outlet buses in each PE of an exemplary multi-stage hypercube-based interconnection network with 4*3 2D-grid of PEs connected in pyramid configuration for scalable distributed computing system with deterministic communication, in accordance with the invention.
Figure 7B:
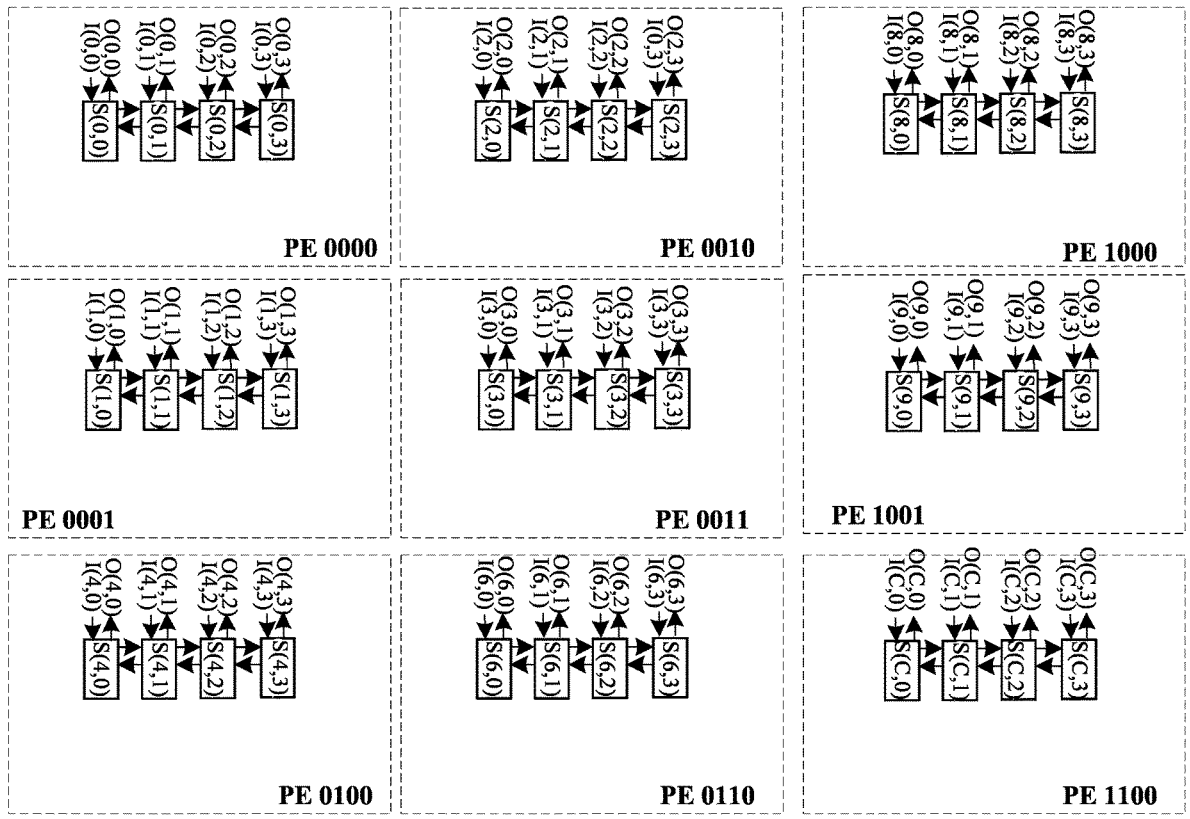
FIG. 7B is a diagram 700B with illustration of inlet buses and outlet buses in each PE of an exemplary multi-stage hypercube-based interconnection network with 3*3 2D-grid of PEs connected in pyramid configuration for scalable distributed computing system with deterministic communication, in accordance with the invention.
Figure 11:
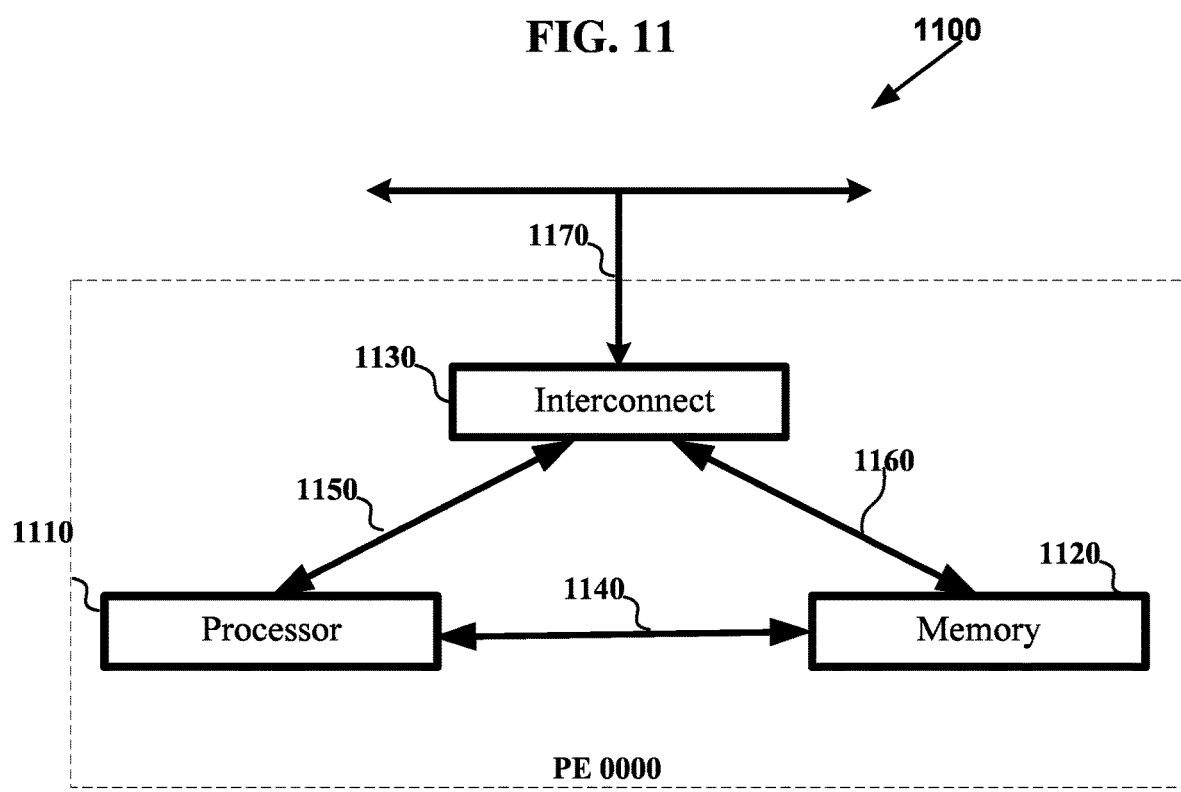
FIG. 11 is a diagram 1100, in one embodiment, with illustration of processor, memory and interconnect and the connections between them at each PE in an exemplary multi-stage hypercube-based interconnection network with a*b 2D-grid of PEs connected in pyramid configuration for scalable distributed computing system with deterministic communication, in accordance with the invention.

In one embodiment, in diagram 100A of FIG. 1A, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, and diagram 1000D of FIG. 10D each PE comprises, in addition to the interconnect, a processor and memory as shown in diagram 1100 of FIG. 11.

Referring to diagram 1100 of FIG. 11, in an exemplary processing element PE 0000 comprises a processor 1110, memory or computer memory 1120, and interconnect 1130. Processor 1110 and memory 1120 is connected by a bus 1140. Processor 1110 and interconnect 1130 is connected by a bus 1150. Interconnect 1130 and memory 1120 is connected by a bus 1160. Interconnect 1130 is connected to the rest of processing elements through buses 1170 and so to the interconnection network. In general, in accordance with the current invention, each of α×b processing elements arranged in a two dimensional grid comprise a processor, memory and interconnect as shown in diagram 1100 of FIG. 11.

In one embodiment, in diagram 100A of FIG. 1A, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, and diagram 1100 of FIG. 11 processor of each processing element is a Central Processing Unit ("CPU") comprises functional units that perform such as additions, multiplications, or logical operations, for executing computer programs.

In another embodiment, in diagram 100A of FIG. 1A, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, and diagram 1100 of FIG. 11 processor of each processing element comprises a domain specific architecture ("DSA") based Deep Neural Network ("DNN") processor comprising one or more multiply accumulate ("MAC") units for matrix multiply operations.

In diagram 100A of FIG. 1A, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, and diagram 1100 of FIG. 11, $\alpha \times b$ processing elements are 1) implemented in two dimensional grid in a single die in one embodiment, or 2) implemented in a plurality of dies on a semiconductor wafer in another embodiment, or 3) implemented in a plurality of integrated circuit chips in yet another embodiment.

Numerous modifications and adaptations of the embodiments, implementations, and examples described herein will be apparent to the skilled artisan in view of the disclosure.

What is claimed is:

1. A scalable distributed computing system comprising:
   wherein said scalable distributed computing system further comprising an $\alpha \times b$ processing elements arranged in a two dimensional grid with one side of said two dimensional grid having the size of $\alpha$ processing elements and the other side of said two dimensional grid having the size of b processing elements where $\alpha > 2$, $b > 2$, and both $\alpha$ and b are non-negative numbers; and
   Wherein said $\alpha \times b$ processing elements are numbered with a representation in binary format having n bits, where $2^{n-1} < \alpha \times b \leq 2^n$ and where n is a positive number; and
   Wherein said $\alpha \times b$ processing elements are arranged in said two dimensional grid so that a first processing element of said $\alpha \times b$ processing elements is placed $2^k$ hops away either vertically or horizontally from a second processing element of said $\alpha \times b$ processing elements when said all n bits of said representation in binary format of said first processing element and said representation in binary format of said second processing element are the same in each bit excepting in one of either $(2 \times k+1)$th least significant bit or $(2 \times k+2)$th least significant bit differ where k is a non-negative number; and
   Wherein each processing element of said $\alpha \times b$ processing elements arranged in said two dimensional grid connected to an interconnect comprising one or more switches; and
   Wherein said one or more switches arranged consecutively starting from a first switch and ending with a last switch, each switch of said one or more switches having an inlet bus and an outlet bus, each switch of said one or more switches, excepting said last switch connected to its succeeding switch by a forward bus and each switch of said one or more switches, excepting said first switch connected to its preceding switch by a backward bus; and
   Wherein a switch of said one or more switches of a first processing element of said $\alpha \times b$ processing elements is connected, by a $2^k$ hop length horizontal bus or a $2^k$ hop length vertical bus, to a switch of said one or more switches of a second processing element of said $\alpha \times b$ processing elements when said all n bits of said representation in binary format of said first processing element and said representation in binary format of said second processing element are the same in each bit excepting in one of either $(2 \times k+1)$th least significant bit or $(2 \times k+2)$th least significant bit differ where k is a non-negative number and also said switch of said one or more switches of said first processing element of said $\alpha \times b$ processing elements is connected, by a $2^k$ hop length horizontal bus or a $2^k$ hop length vertical bus, from said switch of said one or more switches of said second processing element of said $\alpha \times b$ processing elements when said all n bits of said representation in binary format of said first processing element and said representation in binary format of said second processing element are the same in each bit excepting in one of either $(2 \times k+1)$th least significant bit or $(2 \times k+2)$th least significant bit differ where k is a non-negative number so that said interconnect of each processing element of said $\alpha \times b$ processing elements comprising one or more horizontal buses connecting to said interconnect of one or more processing elements of said $\alpha \times b$ processing elements and said interconnect of each processing element of said $\alpha \times b$ processing elements comprising one or more vertical buses connecting to said interconnect of one or more processing elements of said $\alpha \times b$ processing elements.

2. The scalable distributed computing system of claim 1, wherein each processing element of said $\alpha \times b$ processing elements further comprises a processor or memory.

3. The scalable distributed computing system of claim 2, wherein said processor of each processing element of said $\alpha \times b$ processing elements is a Central Processing Unit (CPU) comprises functional units that perform such as additions, multiplications, or logical operations, for executing computer programs.

4. The scalable distributed computing system of claim 2, wherein said processor of each processing element of said $\alpha \times b$ processing elements comprises a domain specific architecture (DSA) based Deep Neural Network (DNN) processor comprising one or more multiply accumulate (MAC) units for performing matrix multiply operations.

5. The scalable distributed computing system of claim 2, wherein said processor, said memory and said interconnect of each processing element of said $\alpha \times b$ processing elements are directly connected to each other.

6. The scalable distributed computing system of claim 1, wherein said two dimensional grid with one side of said two dimensional grid having said size of $\alpha$ processing elements and said other side of said two dimensional grid having said size of b processing elements is recursively scaled for larger sizes of said size of $\alpha$ processing elements or said other side of said two dimensional grid scaled for larger sizes of said size of b processing elements.

7. The scalable distributed computing system of claim 1, wherein said α×b processing elements are implemented in said two dimensional grid 1) in a single die, or 2) in a plurality of dies on a semiconductor wafer, or 3) in a plurality of integrated circuit chips.

8. A method for deterministic communication in a scalable distributed computing system comprising:
wherein said scalable distributed computing system further comprising an α×b processing elements arranged in a two dimensional grid with one side of said two dimensional grid having the size of α processing elements and the other side of said two dimensional grid having the size of b processing elements where α>2, b>2, and both α and b are non-negative numbers; and
Wherein said α×b processing elements are numbered with a representation in binary format having n bits, where $2^{n-1} < α×b ≤ 2^n$ and where n is a positive number; and
Wherein said α×b processing elements are arranged in said two dimensional grid so that a first processing element of said α×b processing elements is placed $2^k$ hops away either vertically or horizontally from a second processing element of said α×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number; and
Wherein each processing element of said α×b processing elements arranged in said two dimensional grid connected to an interconnect comprising one or more $2^k$ hop length horizontal buses and one or more $2^k$ hop length vertical buses where k is a non-negative number; and
Wherein each horizontal bus of said one or more $2^k$ hop length horizontal buses comprises one or more wires and each vertical bus of said one or more $2^k$ hop length vertical buses comprises one or more wires; and
Wherein a switch of said one or more switches of a first processing element of said α×b processing elements is connected, by a $2^k$ hop length horizontal bus of said one or more $2^k$ hop length horizontal buses or a $2^k$ hop length vertical bus of said one or more $2^k$ hop length vertical buses, to a switch of said one or more switches of a second processing element of said α×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number and also said switch of said one or more switches of said first processing element of said α×b processing elements is connected, by a $2^k$ hop length horizontal bus of said one or more $2^k$ hop length horizontal buses or a $2^k$ hop length vertical bus of said one or more $2^k$ hop length vertical buses, from said switch of said one or more switches of said second processing element of said α×b processing elements when if said all n bits of said representation in binary format of said first processing element and said representation in binary format of said second processing element are the same in each bit excepting in one of either (2×k+1)th least significant bit or (2×k+2)th least significant bit differ where k is a non-negative number so that said interconnect of each processing element of said α×b processing elements comprising said one or more $2^k$ hop length horizontal buses connecting to said interconnect of one or more processing elements of said α×b processing elements and said interconnect of each processing element of said α×b processing elements comprising said one or more $2^k$ hop length vertical buses connecting to said interconnect of one or more processing elements of said α×b processing elements; and
each processing element of said α×b processing elements further comprising one or more packets wherein each packet of said one or more packets comprises a data token and a length; and
said interconnect of each processing element of said α×b processing elements is capable of concurrently transmitting, in a clock speed of operation, one or more packets of said one or more packets through one or more horizontal buses of said one or more $2^k$ hop length horizontal buses connected from said interconnect of each processing element of said α×b processing elements (source processing element) to a processing element of said α×b processing elements (target processing element) and also through one or more vertical buses of said one or more $2^k$ hop length vertical buses connected from said interconnect of each processing element of said α×b processing elements (source processing element) to a processing element of said α×b processing elements (target processing element); and
said method for deterministic communication further comprising:
performing concurrent broadcast of each packet of said one or more packets from each source processing element of said α×b processing elements to target processing elements of all the rest of said α×b processing elements in a plurality of deterministic number of time steps through said one or more $2^k$ hop length horizontal buses or said one or more $2^k$ hop length vertical buses; and
wherein said each packet of said one or more packets traverses through one or more processing element of said α×b processing elements (intermediate processing element) when said source processing element of said α×b processing elements and said target processing element of said α×b processing elements are not directly connected by one of either said one or more $2^k$ hop length horizontal buses or said one or more $2^k$ hop length vertical buses; and
wherein duration of each time step of said plurality of deterministic number of time steps is determined by the length of said of said one or more packets, the hop length of said one or more $2^k$ hop length horizontal buses, the hop length of said one or more $2^k$ hop length vertical buses, the number of wires in each bus of said one or more $2^k$ hop length horizontal buses, the number of wires in each bus of said one or more $2^k$ hop length vertical buses, a implemented non-transitory medium of said one or more $2^k$ hop length horizontal buses or said one or more $2^k$ hop length vertical buses, and said clock speed of operation; and
wherein said concurrent broadcast of each packet of said one or more packets of each processing element of said α×b processing elements is performed in a non-blocking, collision-free or without requiring to queue at the one or more intermediate processing elements of said α×b processing elements.

9. The method for deterministic communication in a scalable distributed computing system of claim 8, wherein said each packet of said one or more packets of said each source processing element of said α×b processing elements broadcasts to said each target processing element of said α×b processing elements in a fixed path, by passing through said interconnect of a predetermined number of intermediate processing elements of said α×b processing elements in said plurality of deterministic number of time steps or passing through said interconnect of a predetermined order of intermediate processing elements of said α×b processing elements in said plurality of deterministic number of time steps.

10. The method for deterministic communication in a scalable distributed computing system of claim 9, wherein a first said target processing element of said α×b processing elements receives said each packet of said one or more packets from said each source processing element of said α×b processing elements in a first predetermined order in said plurality of deterministic number of time steps.

11. The method for deterministic communication in a scalable distributed computing system of claim 10, wherein a second said target processing element of said α×b processing elements receives said each packet of said one or more packets from said each source processing element of said α×b processing elements in a second predetermined order in said plurality of deterministic number of time steps and said second predetermined order is not the same as said first predetermined order.

12. The method for deterministic communication in a scalable distributed computing system of claim 8, wherein said performing concurrent broadcast of each packet of said one or more packets at each processing element of said α×b processing elements in said plurality of deterministic number of time steps is repeated for every packet of said one or more packets of each processing element of said α×b processing elements in said deterministic number of time steps.

13. The method for deterministic communication in a scalable distributed computing system of claim 12, wherein a first said target processing element of said α×b processing elements receives said each packet of said one or more packets from said each source processing element of said α×b processing elements in a predetermined order in said plurality of deterministic number of time steps and said first said target processing element of said α×b processing elements receives said one or more packets from said each source processing element of said α×b processing elements in a predetermined order in said plurality of deterministic number of time steps multiplied by number of said one or more packets where said first said target processing element of said α×b processing elements receives said one or more packets from said each source processing element of said α×b processing elements in the same order they were broadcasted by said first said target processing element of said α×b processing elements.

14. The method for deterministic communication in a scalable distributed computing system of claim 8, when α=2; b=2, said performing concurrent broadcast of each packet of said one or more packets at each processing element of said α×b processing elements to all the rest of said α×b processing elements in a plurality of deterministic number of time steps is equal to 2.

15. The method for deterministic communication in a scalable distributed computing system of claim 8, when α=4; b=2 or α=2; b=4, said performing concurrent broadcast of each packet of said one or more packets at each processing element of said α×b processing elements to all the rest of said α×b processing elements in a plurality of deterministic number of time steps is equal to 4.

16. A scalable distributed computing system comprising:
wherein said scalable distributed computing system further comprising an α×b processing elements arranged in a two dimensional grid with one side of said two dimensional grid having the size of α processing elements and the other side of said two dimensional grid having the size of b processing elements where where α>2, b>2, and both α and b are non-negative numbers; and wherein each processing element of said α×b processing elements further comprises a processor or memory; and Wherein said α×b processing elements are numbered with a representation in binary format having n bits, where $2^{2-1} < α×b ≤ 2^n$ and where n is a positive number; and Wherein said α×b processing elements are arranged in said two dimensional grid so that a first processing element of said α×b processing elements is placed $2^k$ hops away either vertically or horizontally from a second processing element of said α×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number; and Wherein each processing element of said α×b processing elements arranged in said two dimensional grid connected to an interconnect comprising one or more switches; and Wherein said one or more switches arranged consecutively starting from a first switch and ending with a last switch, each switch of said one or more switches having an inlet bus and an outlet bus, each switch of said one or more switches, excepting said last switch connected to its succeeding switch by a forward bus and each switch of said one or more switches, excepting said first switch connected to its preceding switch by a backward bus; and Wherein a switch of said one or more switches of a first processing element of said α×b processing elements is connected, by a $2^k$ hop length horizontal bus or a $2^k$ hop length vertical bus, to a switch of said one or more switches of a second processing element of said α×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number and also said switch of said one or more switches of said first processing element of said α×b processing elements is connected, by a $2^k$ hop length horizontal bus or a $2^k$ hop length vertical bus, from said switch of said one or more switches of said second processing element of said α×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number so that said interconnect of each processing element of said α×b processing elements comprising one or more horizontal buses connecting to said interconnect of one or more processing elements of said α×b processing elements and said interconnect of each processing element of said α×b processing elements comprising one or more vertical buses connecting to said interconnect of one or more processing elements of said α×b processing elements.

17. The scalable distributed computing system of claim 16, wherein said processor of each processing element of said α×b processing elements is a Central Processing Unit (CPU) comprises functional units that perform such as additions, multiplications, or logical operations, for executing computer programs or said processor of each processing element of said α×b processing elements comprises a domain specific architecture (DSA) based Deep Neural Network (DNN) processor comprising one or more multiply accumulate (MAC) units for performing matrix multiply operations.

18. The scalable distributed computing system of claim 17, wherein said processor, said memory and said interconnect of each processing element of said α×b processing elements are directly connected to each other.

19. The scalable distributed computing system of claim 17, wherein said α×b processing elements are implemented in said two dimensional grid 1) in a single die, or 2) in a plurality of dies on a semiconductor wafer, or 3) in a plurality of integrated circuit chips.

20. The scalable distributed computing system of claim 17, wherein said each $2^k$ hop length horizontal bus comprises one or more wires and said each $2^k$ hop length vertical bus comprises one or more wires.

* * * * *